(12) United States Patent
Fujino et al.

(10) Patent No.: US 7,702,515 B2
(45) Date of Patent: Apr. 20, 2010

(54) JOB SEEKING SUPPORT METHOD, JOB RECRUITING SUPPORT METHOD, AND COMPUTER PRODUCTS

(75) Inventors: Akio Fujino, Tokyo (JP); Naotake Shindou, Tokyo (JP); Kenji Sakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2198 days.

(21) Appl. No.: 10/279,882

(22) Filed: Oct. 25, 2002

(65) Prior Publication Data
US 2003/0187680 A1    Oct. 2, 2003

(30) Foreign Application Priority Data
Mar. 26, 2002    (JP)    ............... 2002-086702

(51) Int. Cl.
*G06Q 99/00*    (2006.01)
(52) U.S. Cl. ........................................................ 705/1
(58) Field of Classification Search ............... 705/1
See application file for complete search history.

(56) References Cited
U.S. PATENT DOCUMENTS
6,567,784 B2 *   5/2003  Bukow ..................... 705/9
7,080,057 B2 *   7/2006  Scarborough et al. ........ 706/60

FOREIGN PATENT DOCUMENTS
JP    11-338881    12/1999

OTHER PUBLICATIONS

Atsushi Miyamoto, et al. "AMS: Case-Based Job Seeking Support System", The Japanese Society for Artificial Intelligence SIG-J-9801-13(12/10) pp. 63-67.
Notice of Rejection dated Oct. 11, 2005.

* cited by examiner

Primary Examiner—Jonathan Ouellette
(74) Attorney, Agent, or Firm—Staas & Halsey LLP

(57) ABSTRACT

A job seeking information input section inputs information for job seeking conditions of a job seeker, and a job seeking information extractor extracts at least one piece of information for job seeking conditions of persons other than the job seeker from a database. A job-recruiter response information extractor extracts all or a part of pieces of job-recruiter response information that relates to respective responses of the job recruiters to the persons whose information corresponds to the extracted information, from a database. An output section outputs the extracted job-recruiter response information.

32 Claims, 41 Drawing Sheets

SITUATION SHOWING
RESPONSES OF JOB
RECRUITERS TO JOB SEEKER

SITUATION SHOWING RESPONSES OF JOB RECRUITERS TO JOB SEEKER

FIG.4

| JOB SEEKER No. | JOB SEEKER'S NAME | TYPE OF BUSINESS | ADDRESS | E-Mail | BIRTHDAY | ACADEMIC BACKGROUND |
|---|---|---|---|---|---|---|
| A00001 | X | TRADING COMPANY | ...SETAGAYA-KU, TOKYO | x@xx.co.jp | 1977.1.1 | GRADUATED ... UNIVERSITY |
| A00002 | Y | TRADING COMPANY | ...SAITAMA-SHI, SAITAMA | y@yy.co.jp | 1972.12.1 | GRADUATED ... UNIVERSITY |
| A00003 | Z | TRADING COMPANY | ...CHUOU, KITA-KU, OSAKA | z@zz.co.jp | 1975.1.23 | GRADUATED ... UNIVERSITY |
| A00004 | W | MANU-FACTURER | ...MUSASHINO-SHI, TOKYO | w@ww.co.jp | 1980.4.12 | GRADUATED ... UNIVERSITY |

| DESIRED PLACE OF WORK | DESIRED TYPE OF JOB | DESIRED ANNUAL INCOME | QUALIFICATION/SKILLS | OTHERS |
|---|---|---|---|---|
| TOKYO | SALES, PLANNING | 500 | ENGLISH PROFICIENCY EXAMINATION 2ND GRADE, FP ... | TWO YEARS EXPERIENCE IN SALES,... |
| NONE | SALES, PLANNING | 800 | TOEIC 700, C LANGUAGE ... | SERVED AS A CAPTAIN IN ... CLUB IN SCHOOL DAYS,... |
| OSAKA | SALES, SE | 600 | VB,Web,FP ... | ... |
| TOKYO | ACCOUNTING, SALES | 550 | ENGLISH PROFICIENCY EXAMINATION 1ST GRADE, FP, ACCOUNTING ... | ... |

FIG.5

| JOB RECRUITER No. | JOB RECRUITER'S NAME | TYPE OF BUSINESS | ADDRESS | E-Mail | ACADEMIC BACKGROUND | AGE | RECRUITED PLACE OF BUSINESS |
|---|---|---|---|---|---|---|---|
| B00001 | A COMPANY | TRADING COMPANY | ...,SHINAGAWA-KU, TOKYO | a@aa.co.jp | UNIVERSITY GRADUATES OR HIGHER | 24~30 | TOKYO, OSAKA |
| B00002 | B COMPANY | TRADING COMPANY | ...,OMIYA-SHI, SAITAMA | b@bb.co.jp | UNIVERSITY GRADUATES OR HIGHER | 26~32 | TOKYO, SENDAI |
| B00003 | C COMPANY | TRADING COMPANY | ...,MEGURO-KU, TOKYO | c@cc.co.jp | UNIVERSITY GRADUATES OR HIGHER | 27~35 | TOKYO, FUKUOKA |
| B00004 | D COMPANY | MANU-FACTURER | ...,CHUOU, KITA-KU, OSAKA | d@dd.co.jp | UNIVERSITY GRADUATES OR HIGHER | 24~33 | OSAKA, NAGOYA |
| B00005 | P COMPANY | TRADING COMPANY | ...,CHIYODA-KU, TOKYO | p@pp.co.jp | UNIVERSITY GRADUATES OR HIGHER | 27~34 | TOKYO, OSAKA |
| B00006 | Q COMPANY | TRADING COMPANY | ...,SHIBUYA-KU, TOKYO | q@qq.co.jp | UNIVERSITY GRADUATES OR HIGHER | 23~30 | OSAKA, NAGOYA |
| B00007 | R COMPANY | TRADING COMPANY | ...,SHIBUYA-KU, TOKYO | r@rr.co.jp | UNIVERSITY GRADUATES OR HIGHER | 24~28 | TOKYO, OSAKA |

| RECRUITED TYPE OF JOB | ESTIMATED ANNUAL INCOME | QUALIFICATION/SKILLS | OTHERS |
|---|---|---|---|
| SALES, PLANNING | 550 | TOEIC 600, BARGAINING POWER... | GIVE PREFERENTIAL TREATMENT TO THE ONE HAVING SALES EXPERIENCE,... |
| SALES, SE | 600 | COOPERATIVITY, LEADERSHIP... | ACADEMIC BACKGROUND IS NOT REQUIRED... |
| ACCOUNTING, PLANNING | 500 | ENGLISH PROFICIENCY EXAMINATION 2ND GRADE, BARGAINING POWER... | REQUIRES THE FOLLOWING SKILLS |
| SALES, SE | 450 | PROGRAM DEVELOPMENT, NEGOTIATION... | ... |
| SALES, SE | 500 | TOEIC 600, COOPERATIVITY... | ... |
| SALES, SE | 550 | TOEIC 600, LEADERSHIP... | ... |
| SALES, SE | 600 | ENGLISH PROFICIENCY EXAMINATION 2ND GRADE... | ... |

FIG.6

| No. | NAME OF JOB SEEKER | NAME OF JOB RECRUITER | RESULT ON EMPLOYMENT | RECRUITING SITUATION | NOTE |
|---|---|---|---|---|---|
| 1 | MR. Y | B COMPANY | DECIDED INFORMALLY | NOW RECRUITING | *** |
| 2 | MR. Y | C COMPANY | REJECTED | NOW RECRUITING | *** |
| 3 | MR. Y | D COMPANY | DECIDED INFORMALLY | NOT RECRUITING | *** |
| 4 | MR. S | J COMPANY | DECIDED INFORMALLY | NOW RECRUITING | *** |

FIG.7

| No. | NAME OF JOB RECRUITER | NAME OF JOB SEEKER | INTEREST | JOB SEEKING SITUATION | NOTE |
|---|---|---|---|---|---|
| 1 | Q COMPANY | MR. Y | YES | IN JOB SEEKING | *** |
| 2 | Q COMPANY | MR. Z | NO | IN JOB SEEKING | *** |
| 3 | Q COMPANY | MR. W | YES | NOT IN JOB SEEKING | *** |
| 4 | T COMPANY | MR. H | YES | IN JOB SEEKING | *** |

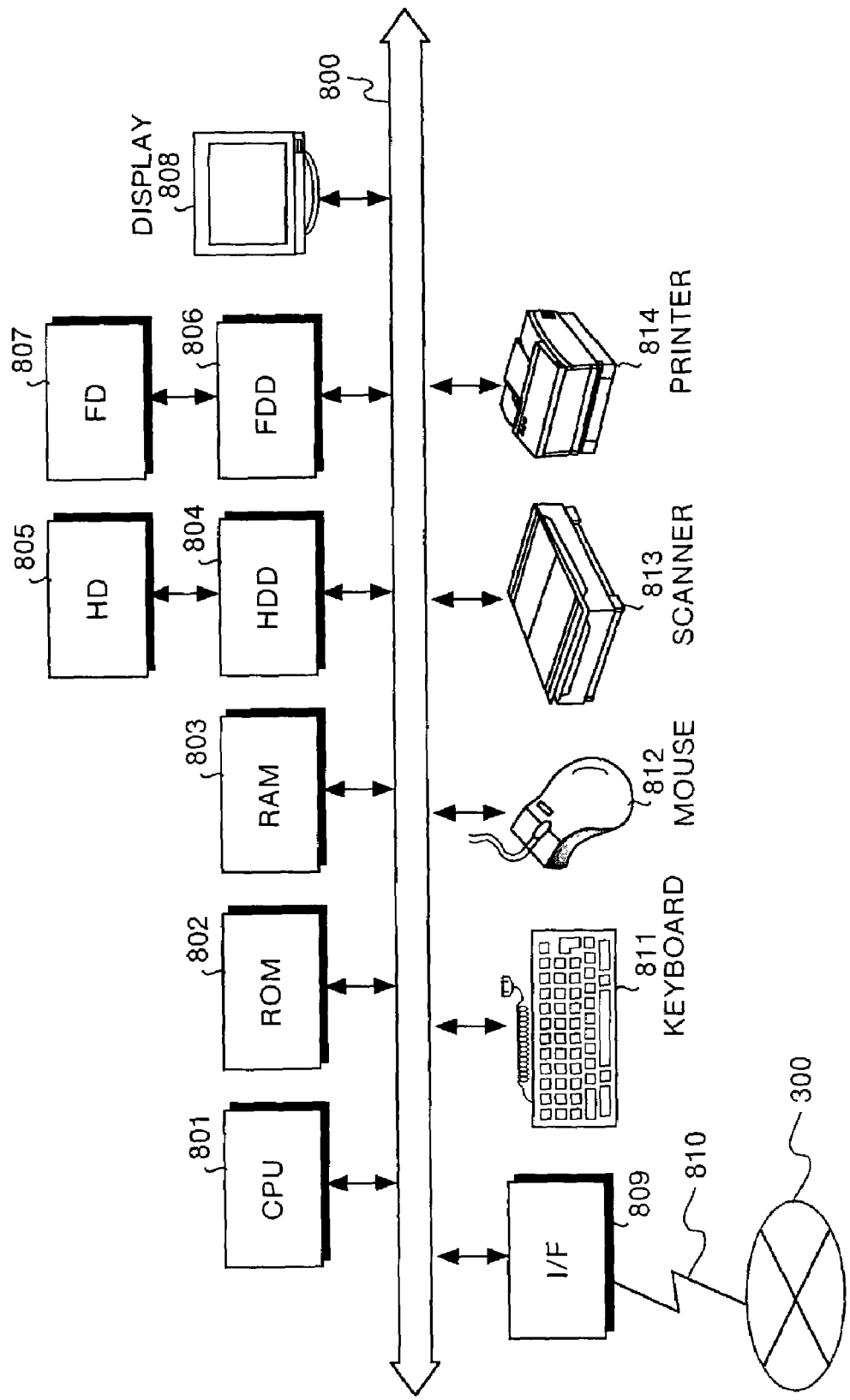

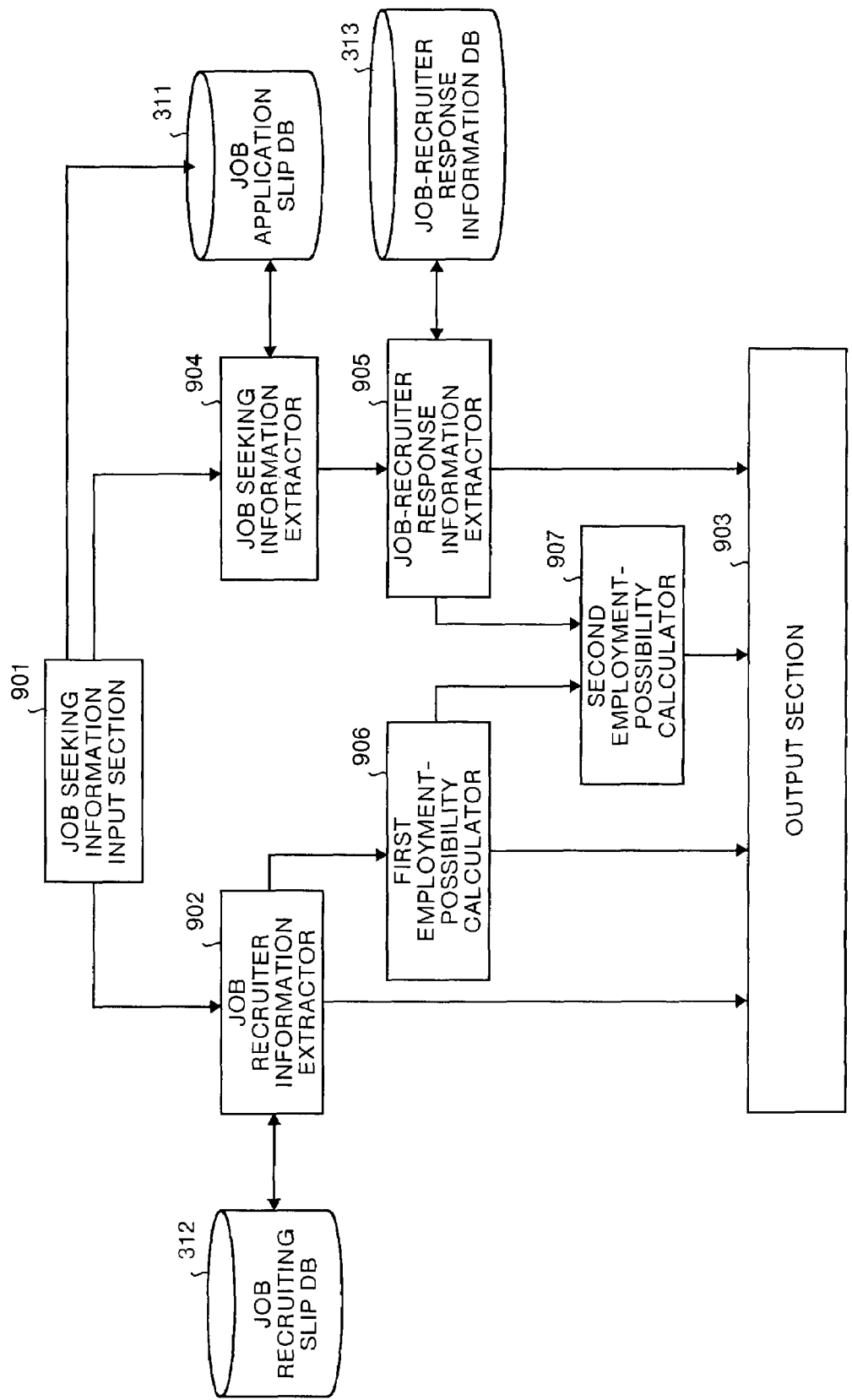

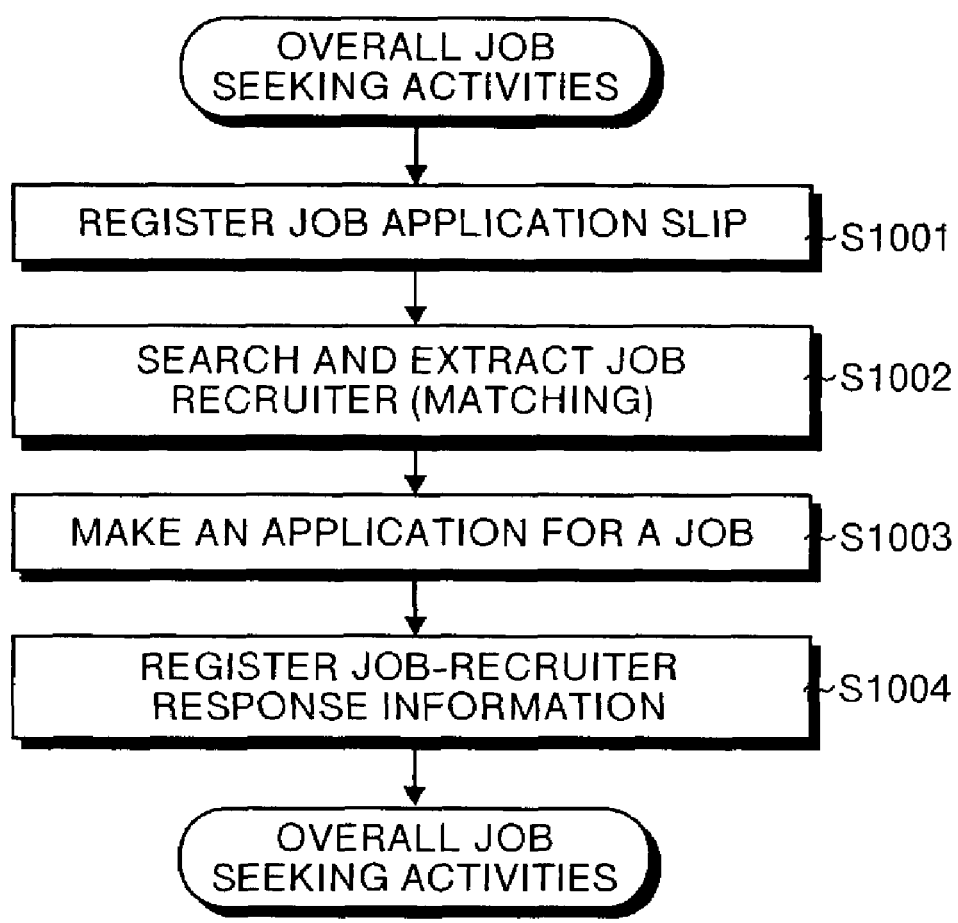

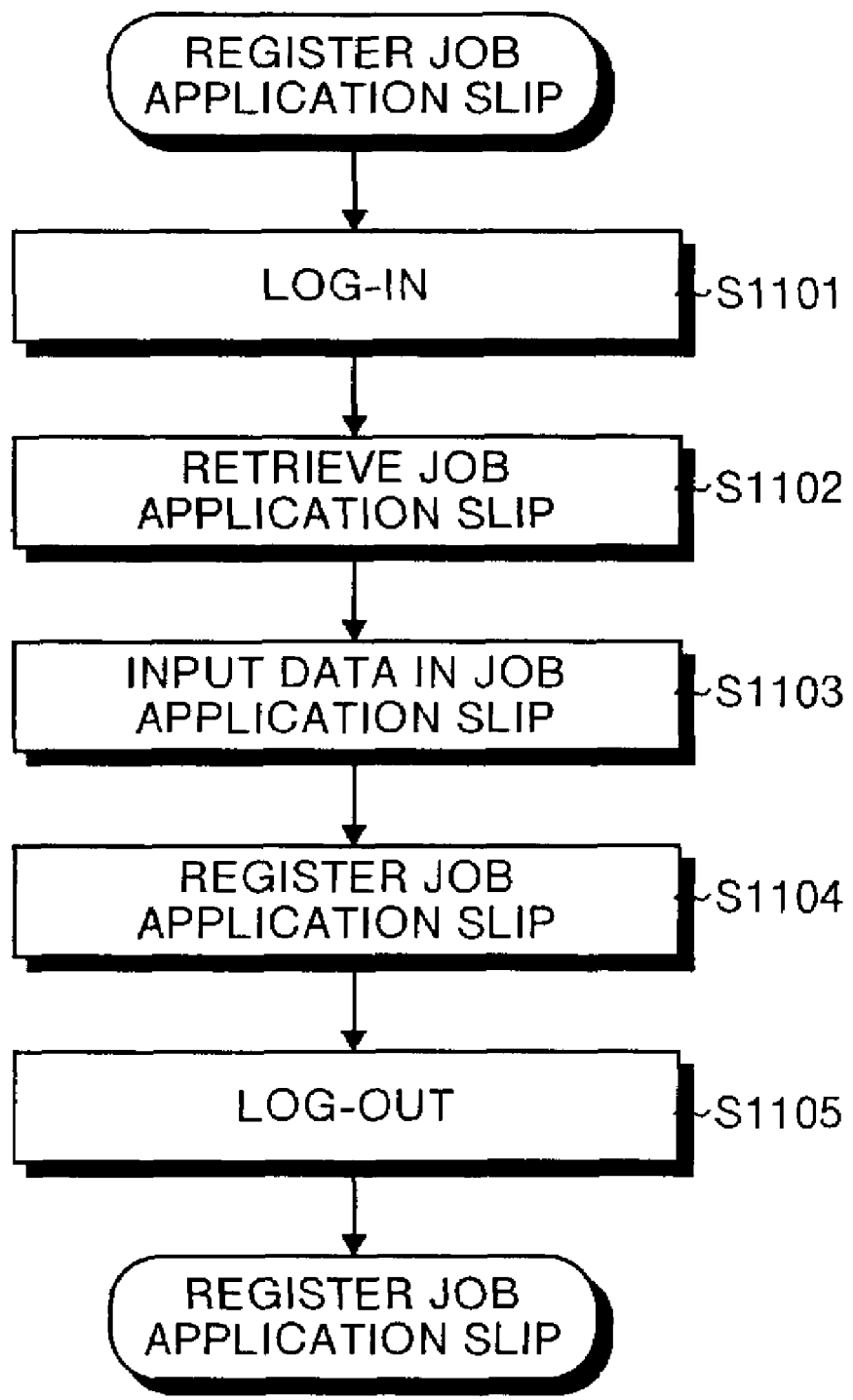

FIG.12

JOB APPLICATION SLIP

1200

| | | PHONETIC TRANSCRIPTIONS IN KANA: | ICHIRO SASAKI |
|---|---|---|---|
| NAME: | ICHIRO SASAKI | | |
| GENDER: | MALE | BIRTHDAY: | 1977.01.01 |
| ADDRESS TO BE REPLIED: | rii@abcxyz.pqrstu.ne.jp | TELEPHONE NO.: | 99-9999-9999 |
| ADDRESS: | POSTAL CODE: 999-9999 | 9-99-99 TAKABAN, SETAGAYA-KU, TOKYO | |
| DESIRED TYPE OF JOB: | SALES | DESIRED ANNUAL INCOME: ¥6,000,000 | DESIRED PLACE OF WORK: TOKYO |
| BUSINESS CAREER: | SALES FOR THREE YEARS IN A FOOD-RELATED TRADING COMPANY, MAINLY ENGAGED IN CHANNEL EXTENSION | | |
| QUALIFICATION: | BOOK-KEEPING GRADE 3, ENGLISH PROFICIENCY EXAMINATION GRADE 2 | | |
| OTHER SKILLS: | PERSONAL COMPUTER (WORD, EXCEL, PowerPoint), ENGLISH | | |
| WHAT I WANT TO DO IN THE COMPANY: | TO MAKE GOOD USE OF ENGLISH, TO ENGAGE IN SALES ACTIVITIES IN OVERSEAS, IN PARTICULAR, TO PERFORM MARKETING DEVELOPMENT IN e-Business, BEING A NEW BUSINESS FIELD. | | |

FIG.21

[OVERALL JOB RECRUITER MATCHING DEGREE LIST] (WHEN r1=40%, r2=60%)

OVERALL JOB RECRUITER
MATCHING DEGREE (A COMPANY) = 92% (WHEN THE FIRST SEARCH RESULT IS DIRECTLY SET)

OVERALL JOB RECRUITER
MATCHING DEGREE (B COMPANY) = 85%×40%+86.2%×60%=85.7%(CALCULATION OF (ii))

OVERALL JOB RECRUITER
MATCHING DEGREE (C COMPANY) = 80%×40%+9.5%×60%=37.7%(CALCULATION OF (iii))

OVERALL JOB RECRUITER
MATCHING DEGREE (D COMPANY) = 95% (WHEN THE SECOND SEARCH RESULT IS DIRECTLY SET)

●FOR JOB SEEKER X

2200

(1) AS A RESULT OF MATCHING WITH JOB RECRUITING SLIPS, THE FOLLOWING JOB RECRUITERS WERE SEARCHED.

2201
1. A COMPANY [TRADING COMPANY] 92%
2. B COMPANY [TRADING COMPANY] 85%
3. C COMPANY [TRADING COMPANY] 80%
· · ·

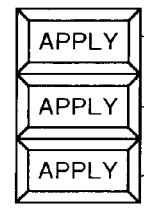
2202

(2) THERE ARE JOB SEEKERS PERSON WHO HAVE SIMILAR JOB SEEKING CONDITIONS TO YOURS.
THE JOB-RECRUITER RESPONSE INFORMATION FOR THESE SEEKERS IS DISPLAYED BELOW.

2203
1. JOB SEEKER Y    95%

[JOB RECRUITER'S RESPONSE]
2204
- B COMPANY (TRADING COMPANY) (DECIDED UNOFFICIALLY)
- C COMPANY (TRADING COMPANY) (REJECTED)
- D COMPANY (MANUFACTURER) (DECIDED UNOFFICIALLY)

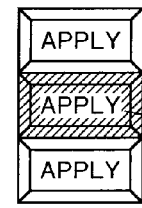
2205

2. JOB SEEKER Z    80%
· · · ·

(3) THE OVERALL EVALUATION IS AS FOLLOWS.

1. D COMPANY [MANUFACTURER] 95%
2. A COMPANY [TRADING COMPANY] 92%
3. B COMPANY [TRADING COMPANY] 85.7%
4. C COMPANY [TRADING COMPANY] 37.7%

2206

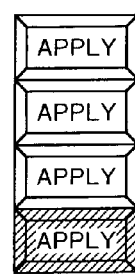
2207

EMPLOYMENT NOTICE

TO MR.ICHIRO SASAKI

YOUR EMPLOYMENT TO OUR COMPANY HAS BEEN DECIDED. WE HEREBY NOTIFY YOU TO COME TO THE PERSONNEL DEPARTMENT OF OUR COMPANY AT 10:00 ON MARCH 15TH.

PERSONNEL DEPARTMENT MANAGER, HITOYAMA SAIO, DENSHIKA KYOIKU CO., LTD. MARCH 1ST, 2002

TO MR.ICHIRO SASAKI

REJECTION NOTICE

WE REGRET TO INFORM YOU THAT WE HAVE DECIDED TO REJECT YOUR APPLICATION FOR A JOB.

PERSONNEL DEPARTMENT MANAGER, HITOYAMA SAIO, DENSHIKA KYOIKU CO., LTD. MARCH 1ST, 2002

FIG.31

JOB RECRUITING SLIP

3100

| | | | | |
|---|---|---|---|---|
| COMPANY NAME: | DENSHIKA KYOIKU CO., LTD. | url: | http://www.denshi_kyouiku.co.jp/ | |
| TYPE OF JOB TO BE RECRUITED: | SALES | PROSPECTS OF ANNUAL INCOME: | ABOUT 5,500,000 YEN | PLACE OF BUSINESS: TOKYO |
| ACADEMIC BACKGROUND: | UNIVERSITY GRADUATES OR HIGHER | | | |
| AGE: | FROM 24 TO ABOUT 30 | | | |
| EXPERIENCE: | MORE THAN 2 YEARS IN SALES (IT IS DESIRED THAT THE APPLICANT HAS EXPERIENCE IN PROPOSING TYPE SALES TO CORPORATE BODIES) | | | |
| SKILLS: | ENGLISH PROFICIENCY EXAMINATION GRADE 2 OR HIGHER, PERSONAL COMPUTER (WORD, EXCEL) | | | |
| CONTENT OF BUSINESS: | OVERSEAS DEVELOPMENT OF e-Learning BUSINESS | | | |
| DETAILS OF BUSINESS: | TAKE CHARGE OF DEVELOPMENT OF CUSTOMERS OF OVERSEAS CORPORATE BODIES IN e-Learning. EXPERIENCE AND KNOWLEDGE AT THE TIME OF APPLICATION ARE NOT REQUIRED, BECAUSE A TRAINING WILL BE HELD FOR e-Learning AFTER JOINING THE COMPANY. AFTER THE TRAINING, THE EMPLOYEE HAS TO MAKE BUSINESS TRIPS ABROAD OFTEN, SINCE HE WILL TAKE CHARGE OF NEGOTIATIONS AND AGREEMENTS WITH OVERSEAS PROSPECTIVE CUSTOMERS, AND DEVELOPMENT OF NEW CUSTOMERS. DOCUMENTS ARE STANDARDIZED BY WORD AND EXCEL, AND HENCE THOSE SKILLS ARE ESSENTIAL (ANY TRAINING ABOUT THOSE WILL NOT BE HELD AFTER JOINING THE COMPANY). | | | |

FIG.34

[FIRST SEARCH RESULT] (JOB SEEKER MATCHING DEGREE 80% OR HIGHER)
[JOB SEEKER]   [JOB SEEKER MATCHING DEGREE]
1. MR. X (WHO DESIRES TRADING COMPANY)   92%
2. MR. Y (WHO DESIRES TRADING COMPANY)   85%
3. MR. Z (WHO DESIRES TRADING COMPANY)   80%

3400

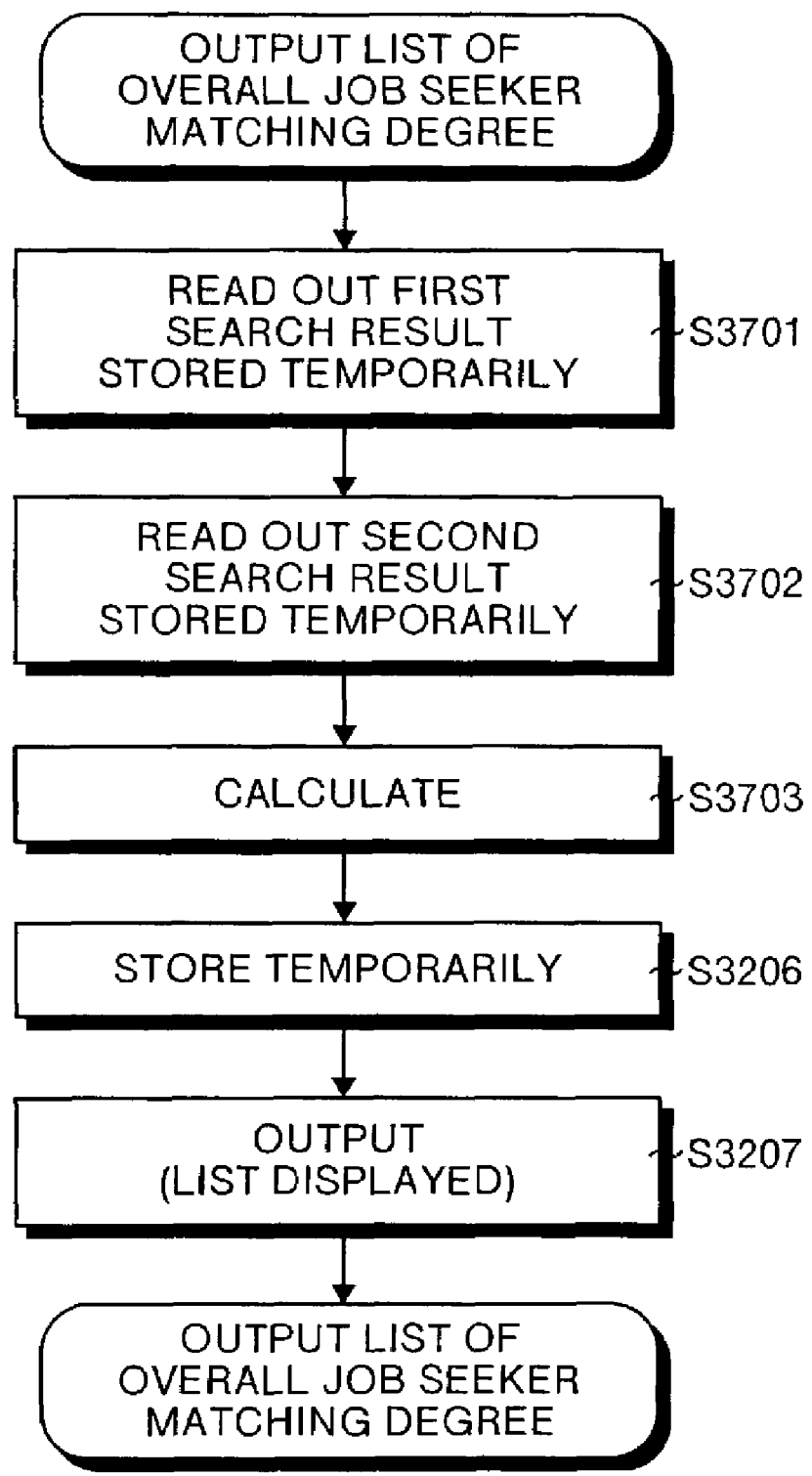

FIG.38

[OVERALL JOB SEEKER MATCHING DEGREE LIST] (WHEN r1=40%, r2=60%)  3800

OVERALL JOB SEEKER
MATCHING DEGREE (MR. X)  = 92% (WHEN THE FIRST SEARCH RESULT IS DIRECTLY SET)

OVERALL JOB SEEKER
MATCHING DEGREE (MR. Y)  = 85%×40%+86.2%×60%=85.7%(CALCULATION OF (ii))

OVERALL JOB SEEKER
MATCHING DEGREE (MR. Z)  = 80%×40%+9.5%×60%=37.7%(CALCULATION OF (iii))

OVERALL JOB SEEKER
MATCHING DEGREE (MR. W)  = 95% (WHEN THE SECOND SEARCH RESULT IS DIRECTLY SET)

FIG.39

(1) AS A RESULT OF MATCHING WITH JOB APPLICATION SLIPS, THE FOLLOWING JOB SEEKERS WERE SEARCHED.

3901

1. MR.X [WHO DESIRES TRADING COMPANY] 92%
2. MR.Y [WHO DESIRES TRADING COMPANY] 85%
3. MR.Z [WHO DESIRES TRADING COMPANY] 80%

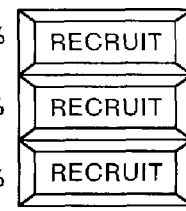

3902

(2) THERE ARE RECRUITERS WHO HAVE SIMILAR JOB RECRUITING CONDITIONS TO YOURS.
THE JOB-SEEKER RESPONSE INFORMATION FOR THESE RECRUITERS IS DISPLAYED BELOW.

3903

1. JOB RECRUITER Q        95%

[JOB SEEKER'S CORRESPONDENCE]
MR. Y [WHO DESIRES TRADING COMPANY] (HAVING AN INTEREST)
3904  MR. Z [WHO DESIRES TRADING COMPANY] (HAVING NO INTEREST)
MR. W [WHO DESIRES MANUFACTURER] (HAVING AN INTEREST)

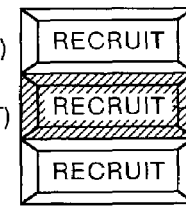

3905

2. JOB RECRUITER R        80%

(3) THE OVERALL EVALUATION IS AS FOLLOWS.

1. MR. W [WHO DESIRES MANUFACTURER] 95%
2. MR. X [WHO DESIRES TRADING COMPANY] 92%
3. MR. Y [WHO DESIRES TRADING COMPANY] 85.7%
4. MR. Z [WHO DESIRES TRADING COMPANY] 37.7%

3906

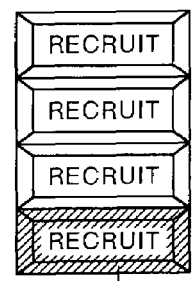

3907

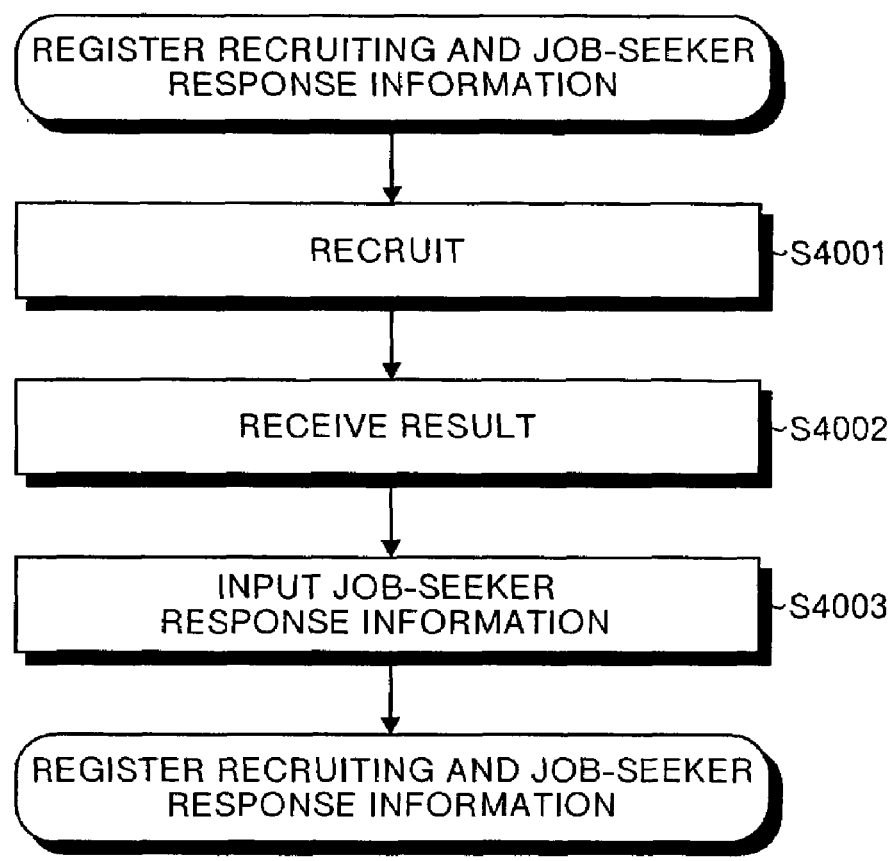

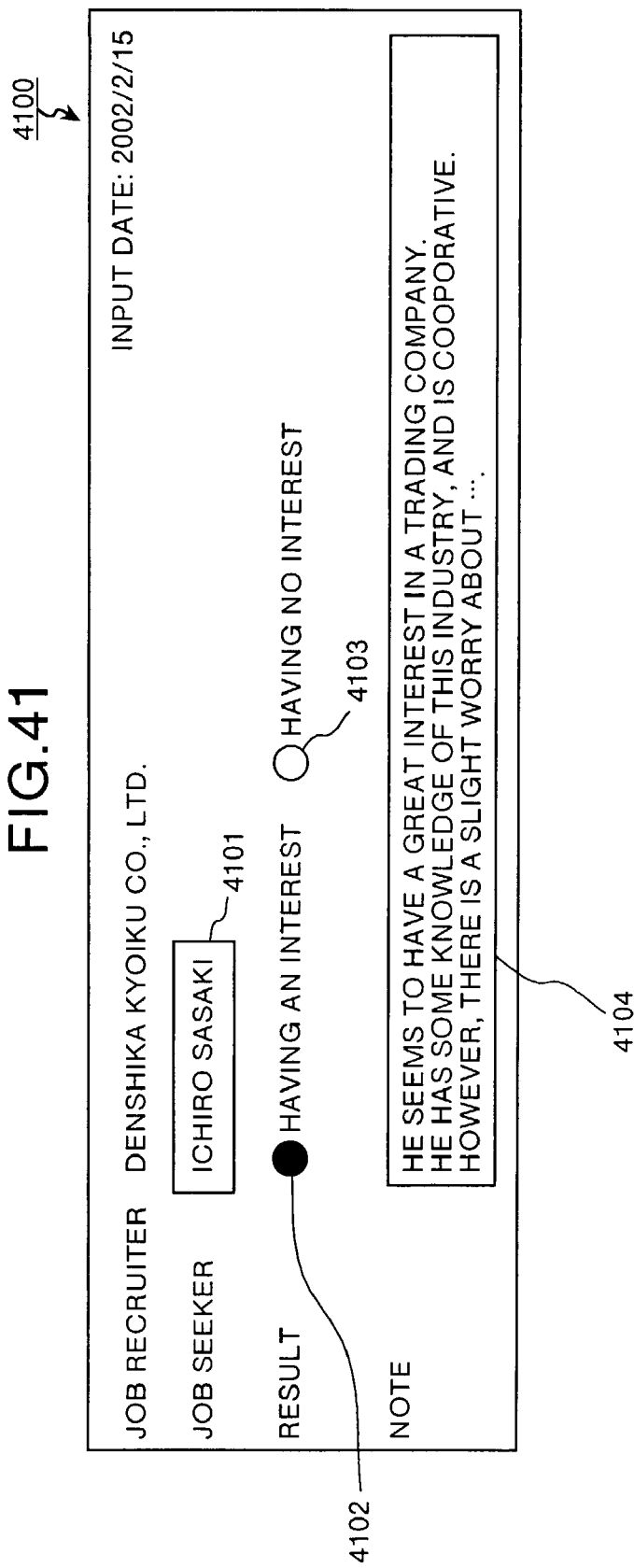

JOB SEEKING SUPPORT METHOD, JOB RECRUITING SUPPORT METHOD, AND COMPUTER PRODUCTS

BACKGROUND OF THE INVENTION

1) Field of the Invention

The present invention relates to a technology for supporting job seekers to seek jobs and job recruiters to recruit new staffs.

2) Description of the Related Art

Conventionally, job seeking and recruiting activities have been carried out in such a manner that job recruiters register job recruiting slips in which skills to be required are described to an employment agency, and a job seeker selects one that is considered to be closest to his/her requirement and skills from the job recruiting slips registered in the employment agency. The job seekers also perform the similar procedure. There is a huge number of job recruiting slips and job application slips. Therefore, in order to perform search efficiently, these slips are generally classified by data relating to bibliographical matter described in each slip, for example, age, occupational category, annual income, place of work, and the like, and search is carried out based on the classification.

As a searching (matching) method, a method of matching respective requirement items (annual income, place of work, and the like) of the job recruiters and the job seekers has been developed, and a text mining technique for texts relating to the skills of job seekers and requirements of the job recruiters has been also developed to allow the search to be automated to some extent.

However, though the precision of search is improved, there is a problem in that the most fitted demands of the job recruiter and the job seeker not always agree with each other in actual cases, only by matching of the job application slip with the job recruiting slip. For example, even if a job seeker extracts any job recruiter whose requirements seem to agree with those described in the own job application slip in terms of matching, and applies to the relevant job recruiter, judgment may be performed by adding the judgment criterion and the policy of the job recruiter in actual cases, and the job seeker is not always employed.

Therefore, there is a problem in that job seekers who apply for a job to end in failure waste their time and cost for the application. Similarly, on the job recruiters, even if a job recruiter extracts any job seeker whose requirements seem to agree with those in the own job recruiting slip in terms of matching, and determines to employ the relevant job seeker through interview, the employment is not always successful because the job seeker changes his/her mind for any reason. Therefore, there is a similar problem in that much of the time and cost for recruiting may be wasted.

SUMMARY OF THE INVENTION

It is an object of this invention to provide a job seeking support method, a job seeking support program, and a job seeking support apparatus capable of efficiently carrying out the job seeking activities, and also a job recruiting support method, a job recruiting support program, and a job recruiting support apparatus capable of efficiently carrying out recruitment.

In order to solve the above problems and achieve the object, the job seeking support method, the job seeking support program, and the job seeking support apparatus are provided as one aspects of this invention. The job seeking support method as a representative of these includes inputting information for job seeking conditions of a job seeker, extracting at least one piece of information for job seeking conditions of persons other than the job seeker, whose contents are similar to those of the input information, extracting all or a part of pieces of job-recruiter response information that relates to respective responses of the job recruiters to the persons whose information corresponds to information for the extracted job seeking conditions, and outputting the extracted job-recruiter response information.

The job seeking support method, the job seeking support program, and the job seeking support apparatus are provided as another aspects of this invention. The job seeking support method as a representative of these includes inputting information for job seeking conditions of a job seeker, extracting at least one piece of information for job seekers based on the input information, and extracting at least one of information for job seeking conditions of persons other than the job seeker, whose contents are similar to those of the input information. The method also includes extracting all or a part of pieces of job-recruiter response information that relates to respective responses of the job recruiter to the persons whose information corresponds to information for the extracted job seeking conditions, and outputting at least either one of the extracted information for the job recruiter and the extracted job-recruiter response information.

According to the above aspects, useful job recruiting information can be easily found, which cannot be found only by matching of the information of job application slips with the job recruiting information.

The job recruiting support method, the job recruiting support program, and the job recruiting support apparatus are provided as still another aspects of this invention. The job recruiting support method as a representative of these includes inputting information for job recruiting conditions of a job recruiter, extracting at least one piece of information for job recruiting conditions of job recruiters other than the job recruiter, whose contents are similar to those of the input information is extracted, extracting all or a part of pieces of job-seeker response information that relates to respective responses of the job seeker to the persons whose information corresponds to those of information for the extracted job recruiting conditions, and outputting the extracted job-seeker response information.

The job recruiting support method, the job recruiting support program, and the job recruiting support apparatus are provided as still another aspects of this invention. The job recruiting support method as a representative of these includes inputting information for job recruiting conditions of a job recruiter, extracting at least one piece of information for the job seeker, and extracting at least one piece of information for job recruiting conditions of persons other than the job recruiter, whose contents are similar to those of the input information. The method also includes extracting and all or a part of pieces of job-seeker response information that relates to respective responses of the job seeker to the persons whose information corresponds to information for the extracted job recruiting conditions, and outputting at least either one of the extracted information for the job seeker and the extracted job-seeker response information.

According to the above aspects, useful job seeking information can be easily found, which cannot be found only by matching of the information of job recruiting slips with the job seeking information.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is an explanatory diagram showing one example of a data structure of job application slip database in web server for employment, being the job seeking support apparatus and the job recruiting support apparatus according to the first and second embodiments, FIG. 5 is an explanatory diagram showing one example of a data structure of job recruiting slip database in the Web server for employment, being the job seeking support apparatus and the job recruiting support apparatus according to the first and second embodiments, FIG. 6 is an explanatory diagram showing one example of a data structure of database for job-recruiter response information in the Web server for employment ("employment Web server"), being the job seeking support apparatus and the job recruiting support apparatus according to the first and second embodiments, FIG. 7 is an explanatory diagram showing one example of a data structure of database for job-seeker response information stored in the employment Web server, being the job seeking support apparatus and the job recruiting support apparatus according to the first and second embodiments, FIG. 8 is a block diagram showing one example of hardware configuration of the employment Web server, being the job seeking support apparatus and the job recruiting support apparatus according to the first and second embodiments, FIG. 9 is a block diagram showing one example of functional structure of the Web server for employment, being the job seeking support apparatus according to the first embodiment, FIG. 10 is a flowchart showing the contents of the overall job seeking activities based on the job seeking support method according to the first embodiment, FIG. 11 is a flowchart showing the contents of job application slip registration processing (step S1001), FIG. 12 is an explanatory diagram showing one example of a job application slip, FIG. 21 is an explanatory diagram showing the output contents of the overall job recruiter matching degree list, FIG. 22 is an explanatory showing one example of display screen for a search result according to the first embodiment, FIG. 24 is an explanatory diagram showing one example of employment notice, FIG. 25 is an explanatory diagram showing one example of rejection notice, FIG. 31 is an explanatory diagram showing one example of the job recruiting slip, FIG. 34 is an explanatory diagram showing the contents of the search result of the first search, FIG. 37 is a flowchart showing the contents of output processing of a list of overall job seeker matching degree (step S3205 to S3207), FIG. 38 is an explanatory diagram showing the output contents of the overall job seeker matching degree list, FIG. 39 is an explanatory diagram showing one example of display screen for a search result according to the second embodiment, FIG. 40 is a flowchart showing the contents of registering processing for recruitment and the job-seeker response information (step S2903, step S2904), FIG. 41 is an explanatory diagram showing one example of input screen for the job-seeker response information.

DETAILED DESCRIPTION

Embodiments of the job seeking support method, the job recruiting support method, the job seeking support program, the job recruiting support program, the job seeking support apparatus, and the job recruiting support apparatus according to the present invention will be explained in detail below with reference to the accompanying drawings.

Figure 1:
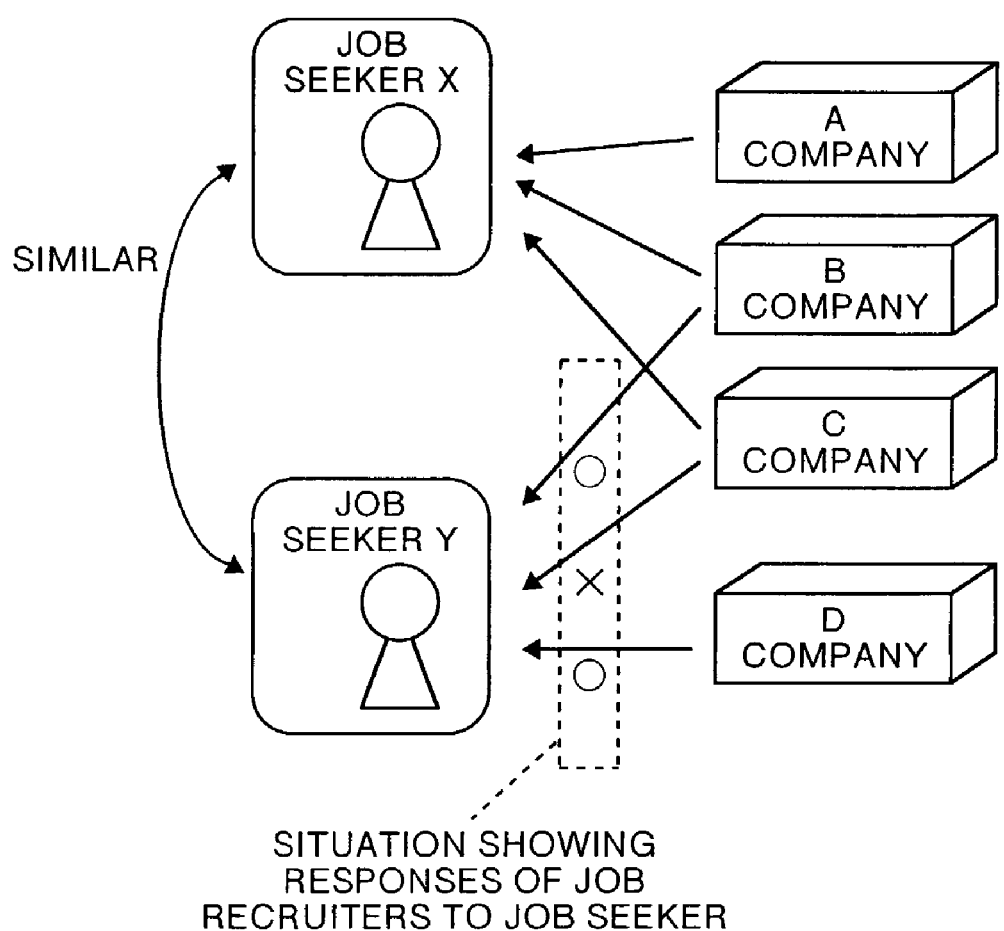
FIG. 1 is an explanatory diagram showing the outline of a first embodiment of this invention.

Outline of Embodiments:

The outline of first and second embodiments of this invention will be explained first. FIG. 1 is an explanatory diagram showing the outline of the first embodiment of this invention. In FIG. 1, when a job seeker (who wants to apply for a job) X is going to apply for a job, he/she searches a most suitable job recruiter using a job seeking and job recruiting support system, to enter the job recruiter in a job application slip, and makes an application. It is assumed that the job seeker X desires to work for, for example, a trading company and writes this effect in the job application slip.

The job seeker X registers the prepared job application slip. Then, content matching is carried out between the job application slip of the job seeker X and all of registered job recruiting slips. As a result of matching, those having a certain value or higher of matching degree are extracted in descending order of the matching degree. For example, it is assumed that job recruiters, A company, B company, and C company (all of them is a trading company) are extracted as those most suitable for the job seeker X. Content matching is further carried out between the job application slip of the job seeker X and all of registered job application slips. By this search processing, any other job seeker (job seeker Y) whose contents in the job application slip are similar to those of the job seeker X is extracted.

The information for the job seeker Y can be made effective use of as described below. That is, for example, the job seeker Y applied for a job to the B company (trading company), the C company (trading company), and D company (manufacturer) in the past, and the following results were obtained: B company: decided unofficially (or employment guarantee given), C company: rejected, and D company: decided unofficially. In this case, it can be judged that, of the A company, B company, and C company extracted by the job seeker X, the B company is likely to give employment guarantee to the job seeker X, but the C company is most likely to reject the application. Further, it can also be judged that the D company not extracted this time will be likely to give employment guarantee to the job seeker X if he/she applies for a job to the D company.

The job seeker X selects a job recruiter to be applied based on the search result, and makes an application. After having applied, the job seeker X registers the job-recruiter response information for the job recruiter to whom he/she has applied. For example, when having applied for a job to the A company, the job seeker X registers information on employment or rejection such as being given employment guarantee or rejected, and reference information such as interview contents or judgment criteria for employment or rejection of the A company as a note. The job-recruiter response information for the job recruiter to whom the job seeker X has applied may be registered at an optional timing, and for example, information for job recruiters to whom the job seeker X applied in the past may be registered at the time of initial registration of the information for the corresponding job recruiter.

Figure 2:
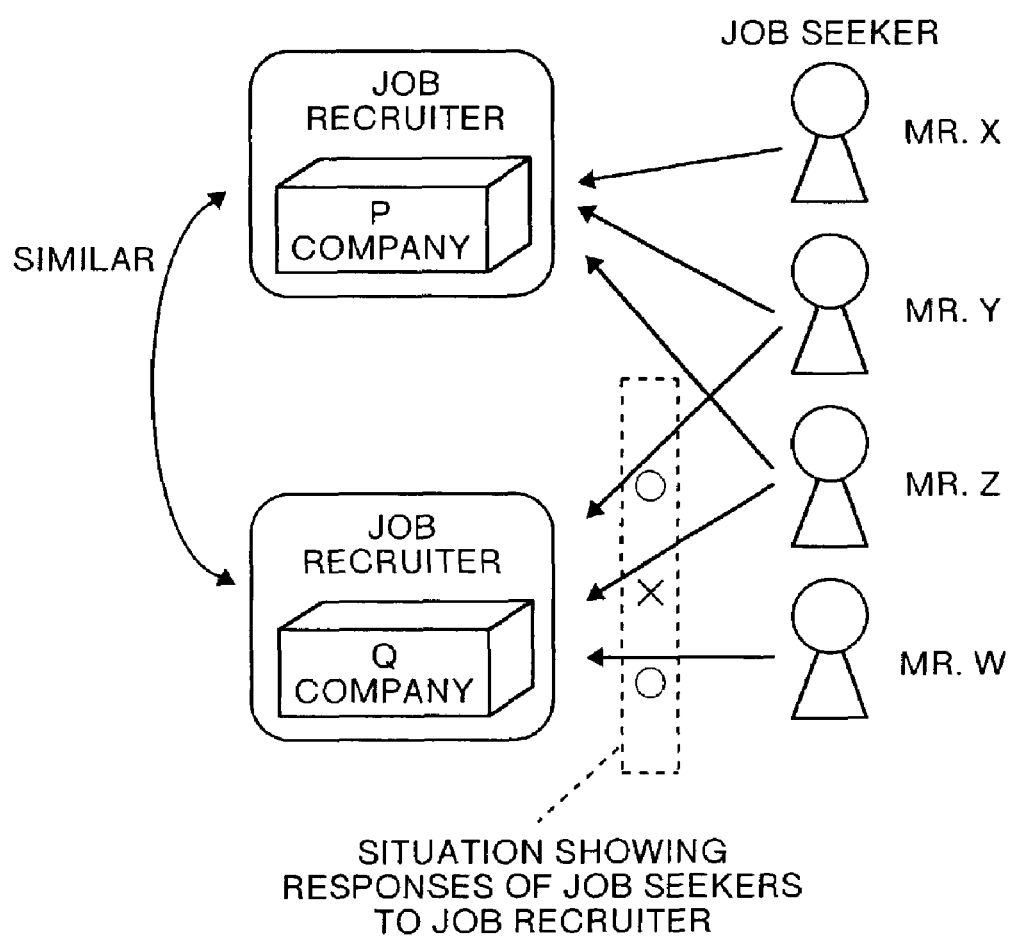
FIG. 2 is an explanatory diagram showing the outline of a second embodiment of this invention.

FIG. 2 is an explanatory diagram showing the outline of a second embodiment of this invention. In FIG. 2, when a job recruiter (who wants to recruit), P company is going to recruit for an employee, the P company searches a job seeker most suitable for the job recruiting slip using the job seeking and job recruiting support system. The P company as a job recruiter is, for example, a trading company, and this matter is written in the job recruiting slip.

The P company as a job recruiter registers the prepared job recruiting slip. Content matching is carried out between the job recruiting slip of the P company and all of registered job recruiting slips. The matching result is obtained by extracting those having a certain value or higher of matching degree in descending order of the matching degree. For example, job seekers X, Y, and Z are extracted as persons who may be most suitable for the P company. Then, content matching is further carried out between the job recruiting slip of the P company and all of registered job recruiting slips. By this search processing, some other job recruiter (job recruiter, Q company) whose job recruiting slip is similar to that of the P company is extracted.

The information for the Q company as a job recruiter can be made effective use of as described below. That is, for example, the Q company decided to recruit Mr. Y (who wanted to work for a trading company), Mr. Z (who wanted to work for a trading company) and Mr. W (who wanted to work for a manufacturer) in the past, and the result was such that Mr. Y (had an interest), Mr. Z (had no interest), and Mr. W (had an interest). In this case, of Mr. X, Mr. Y, and Mr. Z extracted by the P company, it can be judged that Mr. Y has a high possibility of acceptance of the job, but Mr. Z has a high possibility of rejection, even if an informal employment decision is made. Further, it can be also judged that Mr. W not extracted this time will have a high possibility of acceptance the job.

The P company as a job recruiter selects a job seeker who they want to recruit based on the search result, and carries out the processing for recruitment. The P company registers the job-seeker response information for the recruited job seeker. For example, when Mr. X is recruited, information for whether the job seeker has an interest or not and reference information such as the impressions at interview as a note are registered. The job-seeker response information for the recruited job seeker may be registered at an optional timing. For example, the information for job seekers who applied for the job in the past may be registered at the initial registration of the information for Mr. X.

Figure 3:
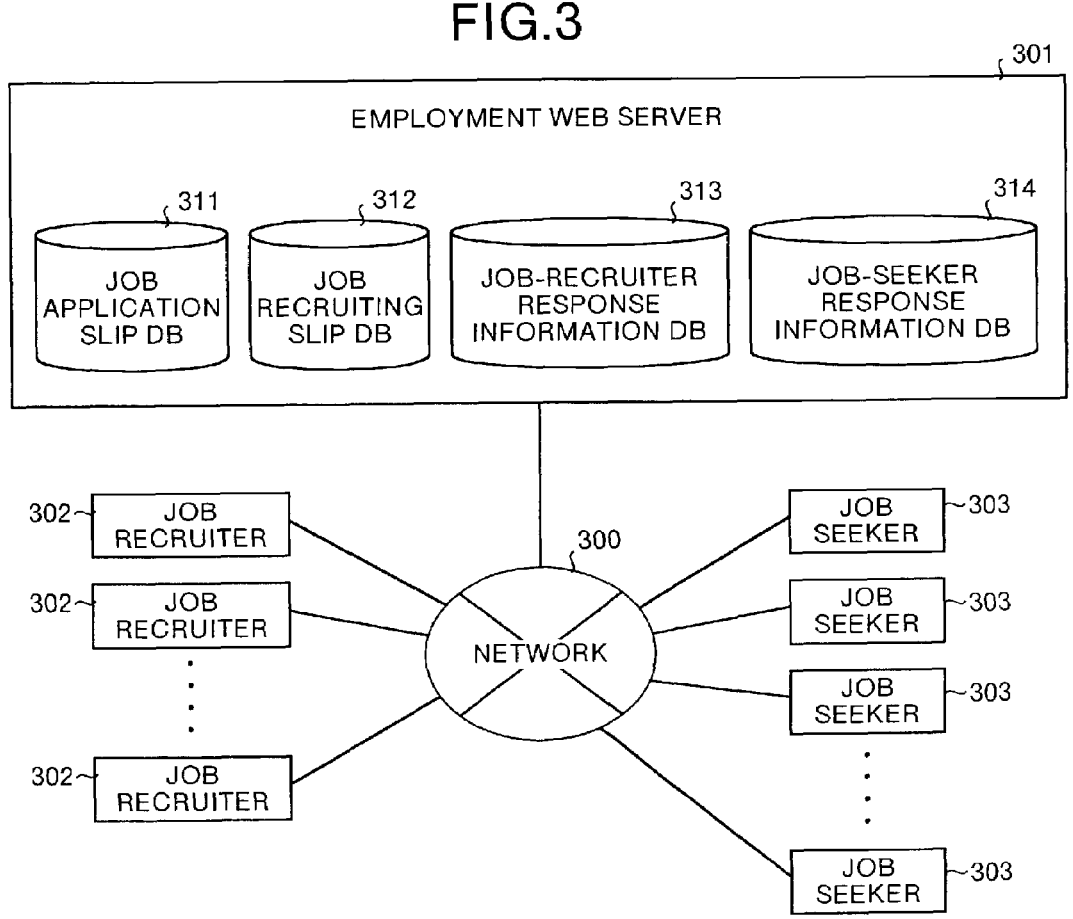
FIG. 3 is an explanatory diagram showing one example of system configuration of a job seeking and job recruiting support system, including a job seeking support apparatus and a job recruiting support apparatus according to the first and second embodiments.

System Configuration of the Job Seeking and Job Recruiting Support System:

The job seeking and job recruiting support system according to the first and second embodiments of this invention will be explained below. FIG. 3 is an explanatory diagram showing one example of system configuration of a job seeking and job-recruiting support system, including the job seeking support apparatus and the job recruiting support apparatus according to the first and second embodiments.

In FIG. 3, reference numeral 300 denotes a network such as LAN or the Internet, and an employment Web server 301 as the job seeking support apparatus and the job recruiting support apparatus according to the embodiments, a terminal unit 302 of each job recruiter (who wants to recruit), and a terminal unit 303 of each job seeker (who wants to apply for a job) are connected to the network 300. The employment Web server 301 comprises a job application slip database 311, a job recruiting slip database 312, a job-recruiter response information database 313, and a job-seeker response information database 314.

Consequently, each job recruiter can transmit or receive various kinds of information through each terminal unit 302 and each job seeker can transmit or receive various kinds of information through each terminal unit 303 via the network 300. These databases 311 to 314 may be provided in the employment Web server 301, or may be provided separately in another database server so as to be accessible via the network 300.

Data Structure of the Databases 311 to 314:

Respective data structure of the databases 311 to 314 will now be explained. FIG. 4 is an explanatory diagram showing one example of data structure of the job application slip database 311 stored in the employment Web server, being the job seeking support apparatus and the job recruiting support apparatus according to the first and second embodiments.

Specifically, FIG. 4 shows a job seeker table, and is composed of items related to job seekers, such as "job seeker No.", "name of job seeker", desired "type of business", "address", "E-Mail" address, "birthday", "academic background", "desired place of work", "desired type of job", "desired annual income", "qualification/skills", and "others".

FIG. 5 is an explanatory diagram showing one example of data structure of the job recruiting slip database stored in the employment Web server, being the job seeking support apparatus and the job recruiting support apparatus according to the first and second embodiments. Specifically, FIG. 5 is a job recruiter table, and is composed of items related to job recruiters, such as "job recruiter No.", "name of job recruiter", "type of business", "address", "E-Mail" address, desired "academic background" of job seeker, "recruited place of business" which is the place of work of the job seeker, "desired type of job" which is the type of job for the job seeker, "estimated annual income" payable to the job seeker, "qualification/skills" as requirements for the job seeker, and "others".

FIG. 6 is an explanatory diagram showing one example of the data structure of the job-recruiter response information database stored in the employment Web server, being the job seeking support apparatus and the job recruiting support apparatus according to the first and second embodiments. Specifically, FIG. 6 is a job-recruiter response information table that is composed of items, such as serial "No.", "name of job seeker", "name of job recruiter", "result", "recruiting situation", and "note". The serial "No." is assigned to each job recruiter to which a job seeker applied. Therefore, when Mr. Y has applied to three companies (B company, C company, and D company), three data is respectively prepared.

FIG. 7 is an explanatory diagram showing one example of data structure of the job-seeker response information database stored in the employment Web server, being the job seeking support apparatus and the job recruiting support apparatus according to the first and second embodiments. Specifically, FIG. 7 is a job-seeker response information table, and is composed of serial "No.", "name of job recruiter", "name of job seeker", "interest", "job seeking situation", and "note". The serial "No." is assigned to each job seeker recruited by a job recruiter. Therefore, when Q company has recruited three persons (Mr. Y, Mr. Z, and Mr. W), three data is respectively prepared.

Hardware Configuration of the Employment Web Server 301 and Terminal Units 302 and 303:

The hardware configuration of the employment Web server 301 and terminal units 302, 303 according to the embodiments of this invention will be explained below. FIG. 8 is a block diagram showing one example of hardware configuration of the employment Web server, being the job seeking support apparatus and the job recruiting support apparatus according to the first and second embodiments and terminal units.

In FIG. 8, each of the employment Web server 301 and terminal units 302, 303 comprises a CPU 801, a ROM 802, a RAM 803, a hard disk drive (HDD) 804, a hard disk (HD) 805, a flexible disk drive (FDD) 806, a flexible disk (FD) 807 as an example of detachable recording medium, a display 808, an interface (I/F) 809, a keyboard 811, a mouse 812, a scanner 813, and a printer 814. Respective components are connected to one another by a bus 800.

The CPU 801 serves as a function of controlling the whole of the employment Web server 301 or the terminal units 302, 303. The ROM 802 stores a program such as a boot program. The RAM 803 is used as a work area of the CPU 801. The HDD 804 controls read and write of the data with respect to the HD 805 under control of the CPU 801. The HD 805 stores the written data under control of the HDD 804.

The FDD 806 controls read and write of the data with respect to the FD 807 under control of the CPU 801. The FD 807 stores the written data under control of the FDD 806, or allows an information processing unit to read the data stored in the FD 807. The detachable recording medium may be a CD-ROM (CD-R, CD-RW), an MO, a DVD (Digital Versatile Disk), or a memory card, other than the FD 807. The display 808 displays not only a cursor, icons, and a tool box, but also windows (browser) relating to data for documents, images, and functional information. For example, the display includes a CRT, a TFT liquid crystal display, and a plasma display.

The I/F 809 is connected to the network 300 such as LAN or the Internet via a communication line 810, and connected to other servers and information processing units via the network 300. The I/F 809 serves as an interface between the network 300 and the inside of each device, and controls input/output of data from/to other servers and information processing units. The I/F 809 is for example a modem.

The keyboard 811 has keys for inputting characters, figures, and various instructions, and performs input of data. The keyboard may be a touch panel-type input pad or ten keys. The mouse 812 is used to perform shift of the cursor and region selection, or shift and size change of windows. The mouse may be a track ball, a joystick, a cross key, or a jog dial, if they have the same function as a pointing device.

The scanner 813 optically reads an image, and captures image data into the information processing unit. The printer 814 prints out image data and document data. The printer includes a laser printer, an ink jet printer, or the like.

The terminal units 302 and 303 may be a personal computer, or a portable information processing terminal unit, for example, a mobile phone. When the terminal units 302 and 303 are mobile phones, each communication controller controls transfer of radio waves to and from a radio base station (not shown), and is connected to the network 300, and to the employment Web server 301 via the network 300. The communication controller serves as an interface between the network 300 and the inside of the device, and controls input and output of data to and from other information processing servers. The communication controller may be provided with a microphone and a speaker (not shown), which are required for functions as a telephone. The microphone inputs speech by converting the speech to an electric signal. The speaker outputs the speech.

In a first embodiment of this invention, the job seeking support method, the job seeking support program, and the job seeking support apparatus will be explained.

Functional Structure of Employment Web Server 301:

The functional structure of the employment Web server 301, being the job seeking support apparatus according to the embodiment will be explained below. FIG. 9 is a block diagram showing one example of the functional structure of the employment Web server 301. In FIG. 9, the employment Web server 301 comprises a job seeking information input section 901, a job recruiter information extractor 902, an output section 903, a job seeking information extractor 904, a job-recruiter response information extractor 905, a first employment-possibility calculator 906, and a second employment-possibility calculator 907.

The job seeking information input section 901 inputs information for the job seeking condition of a job seeker. The job seeker is a person who searches information for a desired job recruiter from the information for job recruiters. The information for the job seeking condition stands for the contents described in a job application slip 1200 shown in FIG. 12 described later. The details of the information for the job seeking condition will be described later. The information for the job seeking condition of a job seeker input through the job seeking information input section 901 is stored in the job application slip DB 311.

Specifically, the job seeking information input section 901 realizes its function by the I/F 809, for example, shown in FIG. 8, or the keyboard 811. Further, the function of the job seeking information input section 901 may be realized by inputting a job application slip written on paper by the scanner 813, and converting the image of the input job application slip to data using an OCR function (not shown).

The job recruiter information extractor 902 extracts the information for one of job recruiters or information for job recruiters from the job recruiting slip DB 312, based on the information input through the job seeking information input section 901. The detailed procedure for search and extraction (matching) of the information will be explained later.

The output section 903 outputs the job seeker information extracted by the job recruiter information extractor 902. Output of the information includes transmitting the information to another information processing unit (including terminal units 302 and 303) via a network such as the network 300, registering the information to the employment Web server 301 or predetermined URLs of other servers so that the information can be read by other information processing units via the Internet, displaying the information on a display screen, or printing the information.

The output section 903 specifically realizes its function by the CPU 801 which executes programs stored in the ROM 802, the RAM 803, the HD 805, or the FD 807 shown in FIG. 8. The output section 903 may realize its function by the display 808 and the printer 814 shown in FIG. 8.

The job seeking information extractor 904 extracts the information for the job seeking condition of a person, other than the job seeker, whose content is similar to the information input through the job seeking information input section 901 from the job application slip DB 311. The extracted information may be one or plural. The detailed procedure for search and extraction (matching) of the similar information will be explained later.

The job-recruiter response information extractor 905 extracts job-recruiter response information from the job-recruiter response information DB 313. More specifically, the job-recruiter response information relates to the response of the job recruiter to a person corresponding to the information for the job seeking condition extracted by the job seeking information extractor 904. The extracted information may be all the pieces of the information or a part thereof. In other word, when there are many pieces of job-recruiter response information for the person corresponding to the information related to the extracted job seeking condition, not all the pieces but only a part of the pieces of the information may be extracted.

The case where the extracted information may be all or a part of the pieces of the information includes a case where the whole of one piece of job-recruiter response information or a part thereof may be extracted. Further, the job-recruiter response information may include the information for the result on application of the job seeker to the job recruiter. The output section 903 outputs either one or both of the information for the job recruiter extracted by the job recruiter information extractor 902 and the job-recruiter response information extracted by the job-recruiter response information extractor 905.

The first employment-possibility calculator 906 calculates the possibility that the job seeker may accept a job offered by the job recruiter, based on the information extracted by the job recruiter information extractor 902. The detailed procedure of the calculation will be described later. The output section 903 may output the information for the possibility of the employment ("employment possibility") calculated by the first employment-possibility calculator 906.

The second employment-possibility calculator 907 calculates the possibility that the job recruiter may employ the job seeker. The calculation is executed based on the information for the employment possibility calculated by the first employment-possibility calculator 906, and the information for the result on application of the job seeker to the job recruiter extracted by the job-recruiter response information extractor 905. The detailed procedure of the calculation will be described later. The output section 903 may output the information for the employment possibility calculated by the second employment-possibility calculator 907.

Each component of the job recruiter information extractor 902, the job seeking information extractor 904, the job-recruiter response information extractor 905, the first employment-possibility calculator 906, and the second employment-possibility calculator 907 realizes the function thereof by the CPU 801 which executes the program. Specifically, the program is stored in the ROM 802, the RAM 803, the HD 805, or the FD 807 shown in FIG. 8.

Contents of the Overall Job Seeking Activities:

A flow of the overall job seeking activities will now be explained. FIG. 10 is a flowchart showing the contents of the overall job seeking activities in the job seeking support method according to the first embodiment. In the flowchart shown in FIG. 10, at first, a job seeker (who wants to apply for a job) registers a job application slip (step S1001). The specific content of registration of the job application slip will be described later (see FIG. 11 and FIG. 12).

Search and extraction (matching) of a job recruiter (who wants to recruit) is carried out based on the registered job application slip (step S1002). The specific content of matching will be described later (see FIG. 13 to FIG. 22). The job seeker (who wants to apply for a job) then applies for a job to the job recruiter (who wants to recruit) (step S1003). The specific content of application will be described later (see FIG. 23). The job-recruiter response information is registered (step S1004) to thereby finish the series of job seeking activities.

Contents of the Job Application Slip Registration Processing:

The contents of the job application slip registration processing at step S1001 will be explained. FIG. 11 is a flowchart showing the contents of registration processing for the job application slip according to the first embodiment. In the flowchart, at first, log-in is carried out to the job seeking and job recruiting support system (step S1101), and a job application slip 1200 as shown in FIG. 12 is retrieved (step S1102). The retrieved slip 1200 is displayed on, for example, the display 808 shown in FIG. 8.

Necessary items are input in the job application slip 1200, using the keyboard 811 and the mouse 812 (step S1103). The job application slip 1200 shows the state that all items are input. Thereafter, the job application slip 1200 is registered in the system (step S1104), and log-out is carried out (step S1105). Thereby, registration processing of the job application slip is finished. In this manner, the registration of the job application slip is carried out through the input form of a browser, and in addition, the registration may be carried out by uploading a text-base file prepared according to a specified format.

Figure 13:
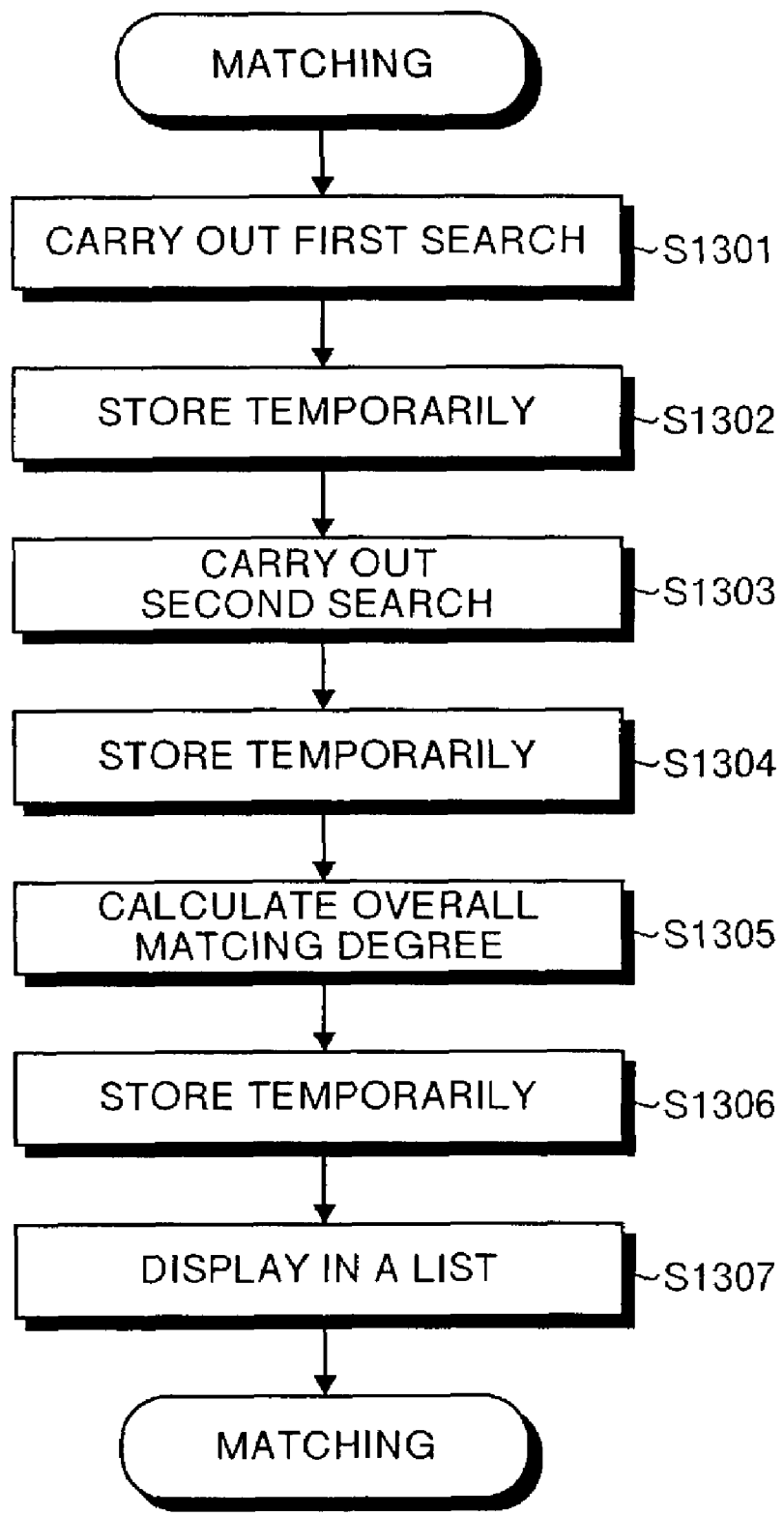
FIG. 13 is a flowchart showing the contents of matching processing (step S1002)

Contents of the Matching Processing:

The contents of the matching processing at step S1002 will be explained below. FIG. 13 is a flowchart showing the contents of the matching processing in the job seeking support method according to the first embodiment. In the flowchart, first search is carried out (step S1301). The result is temporarily stored on the memory (step S1302).

Second search is then carried out (step S1303). The result is also temporarily stored on the memory (step S1304). Thereafter, the degree of overall matching is calculated (step S1305), and the result is also temporarily stored on the memory (step S1306). The temporarily stored results are displayed in a list form (step S1307).

Figure 14:
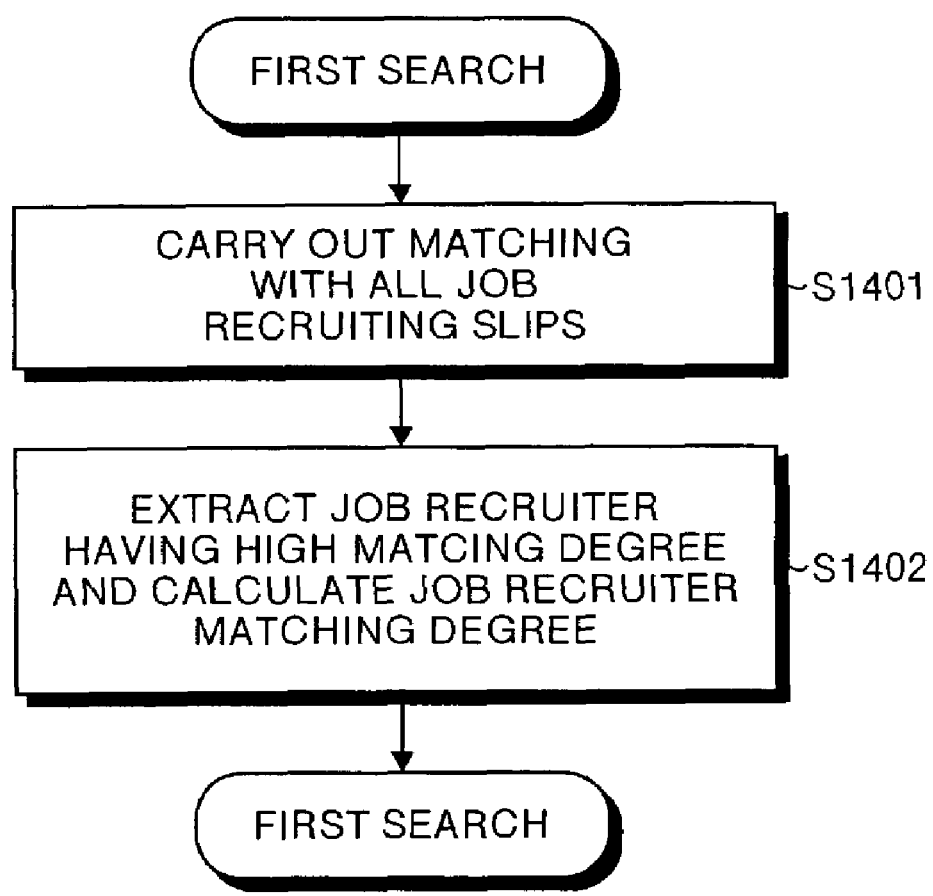
FIG. 14 is a flowchart showing the contents of first search processing (step S1301)
Figure 15:
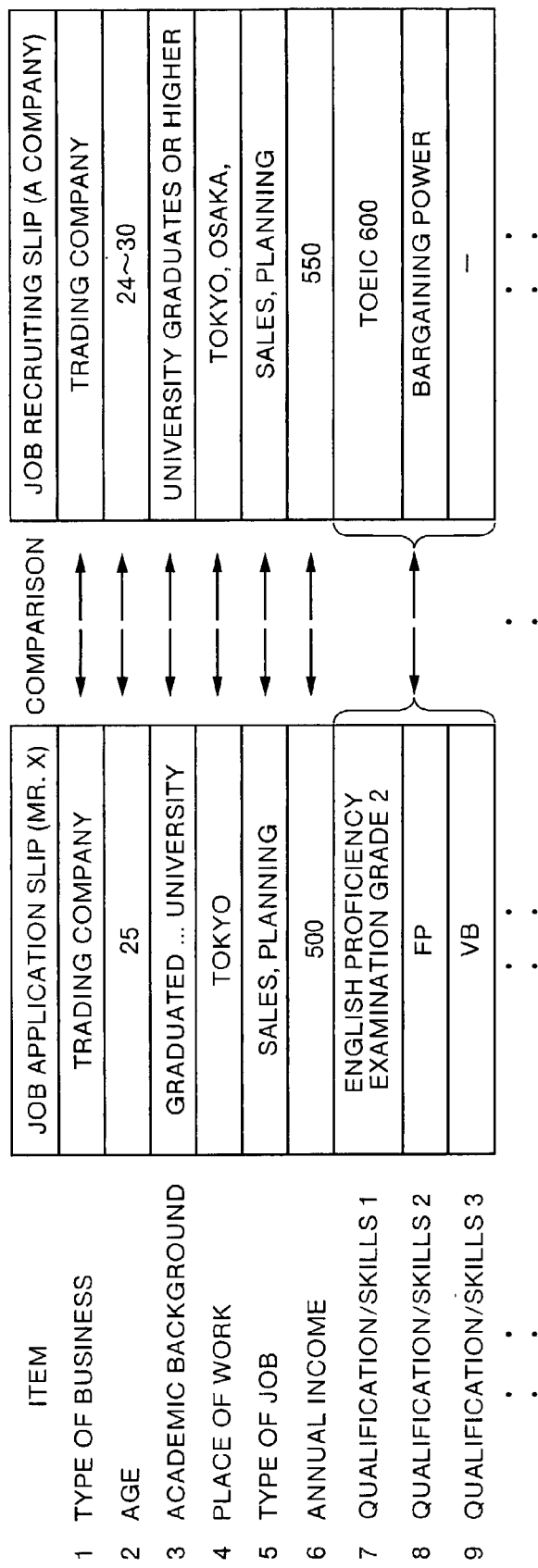
FIG. 15 is an explanatory diagram showing one example of matching in the first search processing.
Figure 16:
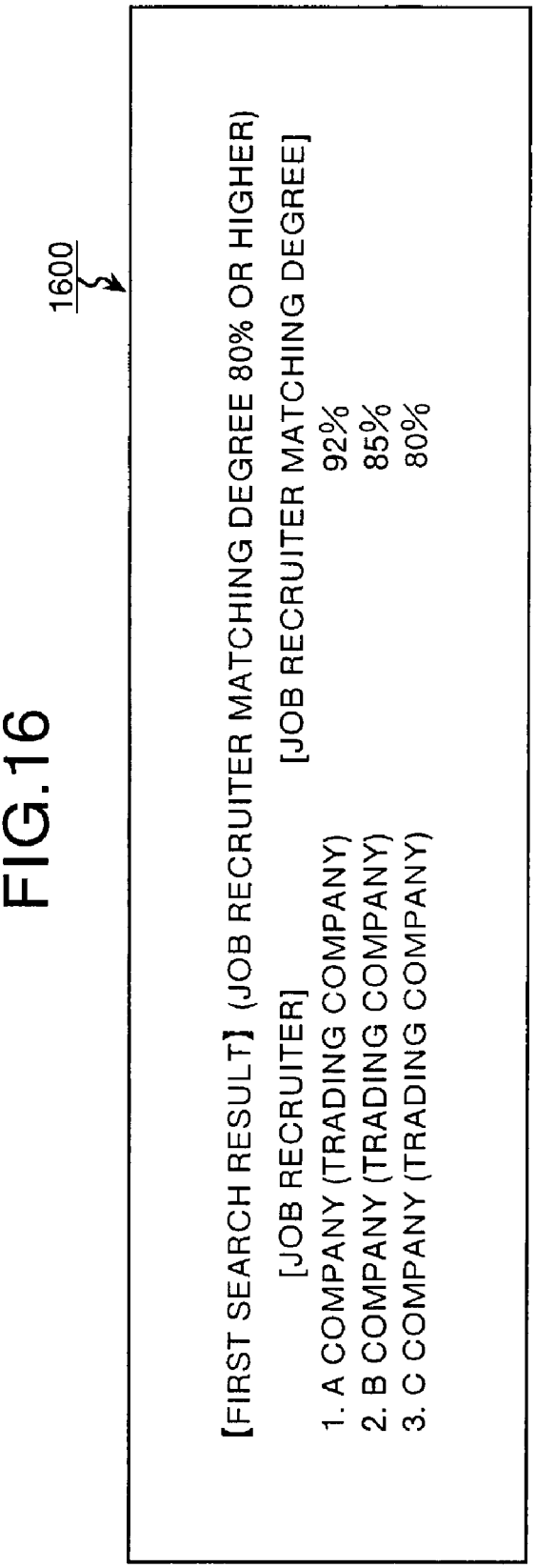
FIG. 16 is an explanatory diagram showing the contents of the search result of the first search.

FIG. 14 is a flowchart showing the contents of the first search processing (step S1301). At first, matching of contents is carried out between the job application slip of a job seeker (who wants to apply for a job) and all job recruiting slips registered in the job recruiting slip DB 312 (step S1401). An algorithm such as word matching or text mining in the known art may be used in the matching method. FIG. 15 is an explanatory diagram showing one example of matching in the first search processing.

As shown in FIG. 15, the matching degree is determined by the ratio of how many items are matched. For example, when 45 items are matched out of 50 items, the matching degree becomes 90%. With respect to one item including a plurality of items (for example, qualification/skills), the matching degree is calculated by designating the number of items in qualification/skills responded by a job recruiter as "the number of items of qualification/skills (population parameter), to determine how many skills of the job seeker is included. In FIG. 15, English proficiency examination Grade 2 is assumed to be TOEIC 600, and counting is carried out when one item (English knowledge) out of two in qualification/skills matches.

Returning to FIG. 14, a job recruiter having a high matching degree is extracted to calculate the matching degree of the job recruiter ("job recruiter matching degree") (step S1402). Specifically, as the matching result, one having a certain value (for example, 80%) or higher is extracted in descending order of the matching degree. For example, it is assumed herein that, for example, A company, B company, and C company (each is a trading company) most suitable for a job seeker X are extracted. The search result 1600 shown in FIG. 16 includes the information for the job recruiter, the type of business, and the job recruiter matching degree, and is stored as a temporary file (step S1302). The job recruiter matching degree for each job recruiter is used for calculating the overall job recruiter matching degree.

Figure 17:
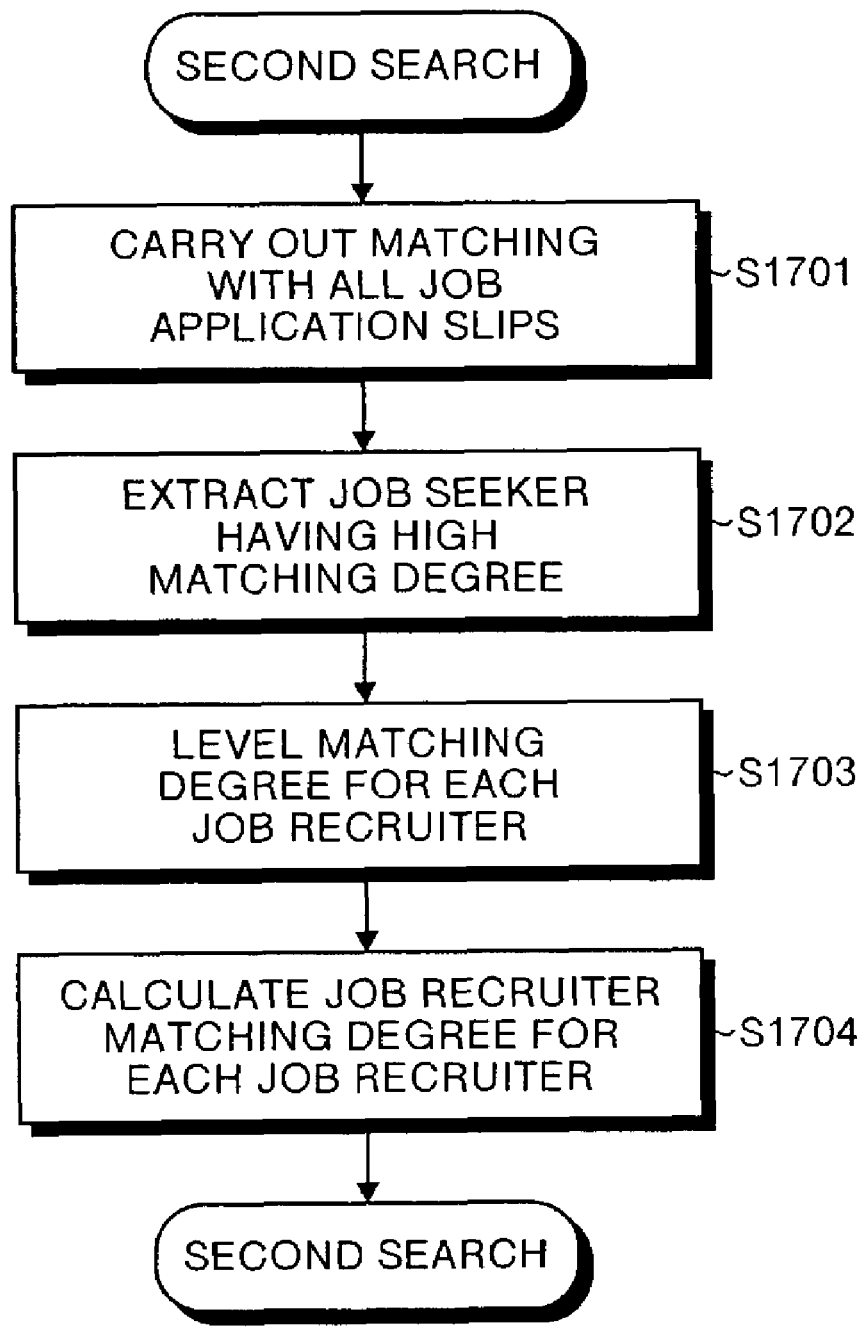
FIG. 17 is a flowchart showing the contents of second search processing (step S1303)
Figure 18:
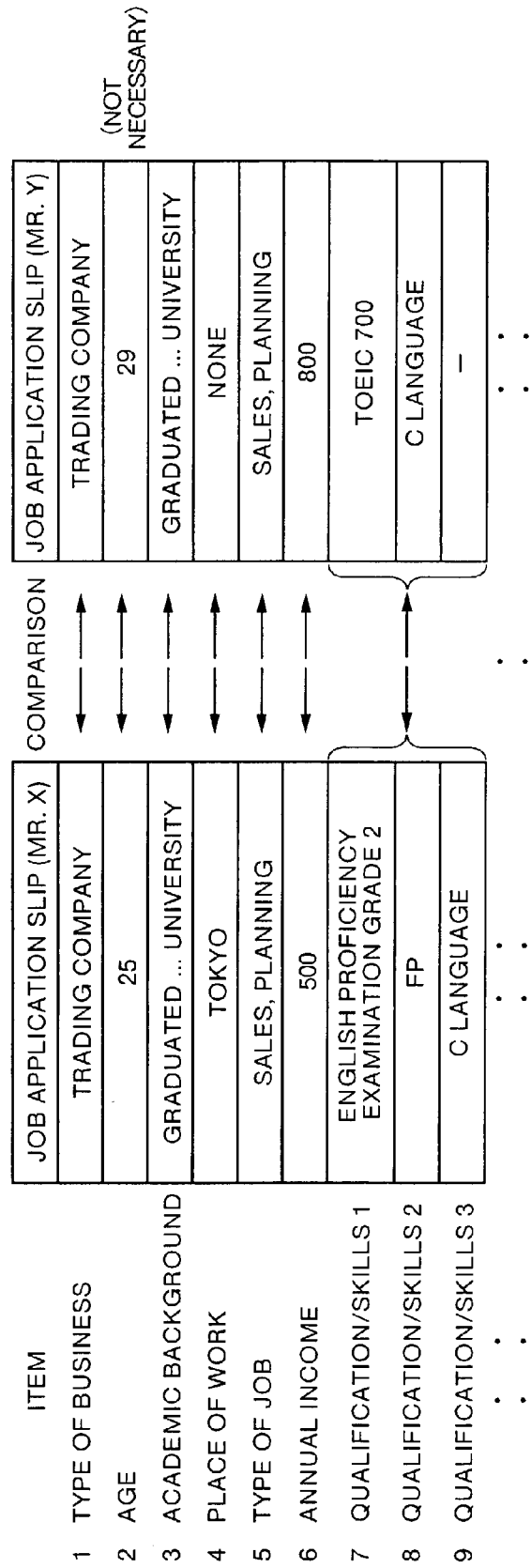
FIG. 18 is an explanatory diagram showing one example of matching in the second search processing.

FIG. 17 is a flowchart showing the contents of the second search processing (step S1303). At first, matching of contents is carried out between the job application slip of a job seeker (who wants to apply for a job) and all job application slips registered in the job application slip DB 311 (step S1701). Any algorithm such as word matching or text mining in the known art may be used in the matching method. FIG. 18 is an explanatory diagram showing one example of matching in the second search processing. As shown in FIG. 18, the degree of matching is determined by the ratio of how many items are matched. The method of determining the ratio is the same as that shown in FIG. 15, and hence the explanation thereof is omitted. In FIG. 18, English proficiency examination Grade 2 is assumed to be TOEIC 700, and counting is carried out when two items (English and C language) out of two match in qualification/skills. Items not required to be matched (for example, age) need not be counted.

Subsequently, a job seeker having a high matching degree is extracted (step S1702). Specifically, as the matching result, one having a certain value (for example, 80%) or higher is extracted in descending order of the matching degree. By this search processing, another job seeker having the similar value to that of the job seeker X is extracted, and the information for this job seeker can be effectively used as described below. For example, it is assumed herein that a job seeker Y having the similar value to that of the job seeker X is extracted by the first search processing (step S1301). It is assumed that the job seeker Y applied for a job to B company (trading company) C company (trading company), and D company (manufacturer) in the past, and that the results are B company: decided unofficially, C company: rejected, and D company: decided unofficially. In this case, it can be judged that of the A company, B company, and C company extracted by the job seeker X in the first search processing, the job seeker X is quite likely to be decided unofficially by B company, and rejected by C company. Further, it can also be easily judged that the job seeker X is quite likely to be decided unofficially by D company of other type of business, which has not been extracted in the first search processing.

Specific calculation of the job recruiter matching degree for each job recruiter is carried out in the following manner. That is, a coefficient of results on employment ("result coefficient") is set in advance. The value is set to be high with respect to the job recruiter who has given employment guarantee to a corresponding job seeker, and set to be low with respect to the job recruiter who has rejected the job seeker. Here, the degree of 100% is provided to the case of giving of employment guarantee, and 10% to the case of rejection. Then, the job recruiter matching degree is calculated for each job recruiter. The job recruiter matching degree can be expressed by the following equation (1).

(job recruiter matching degree)=(job seeker matching degree)×(result coefficient)　　(1)

Leveling is performed in accordance with the ratio of the job seeker matching degree for each job recruiter (step S1703), and the job recruiter matching degree is calculated for each job recruiter, using the following equation (2) (Step S1704).

(job recruiter matching degree of a certain job recruiter)

$$= \sum_{k=1}^{n} (\text{matching degree of job seeker } k)/(\text{total matching degree of all job seekers}) \times (\text{job recruiter matching degree in column of the job seeker } k) \quad (2)$$

Figure 19:
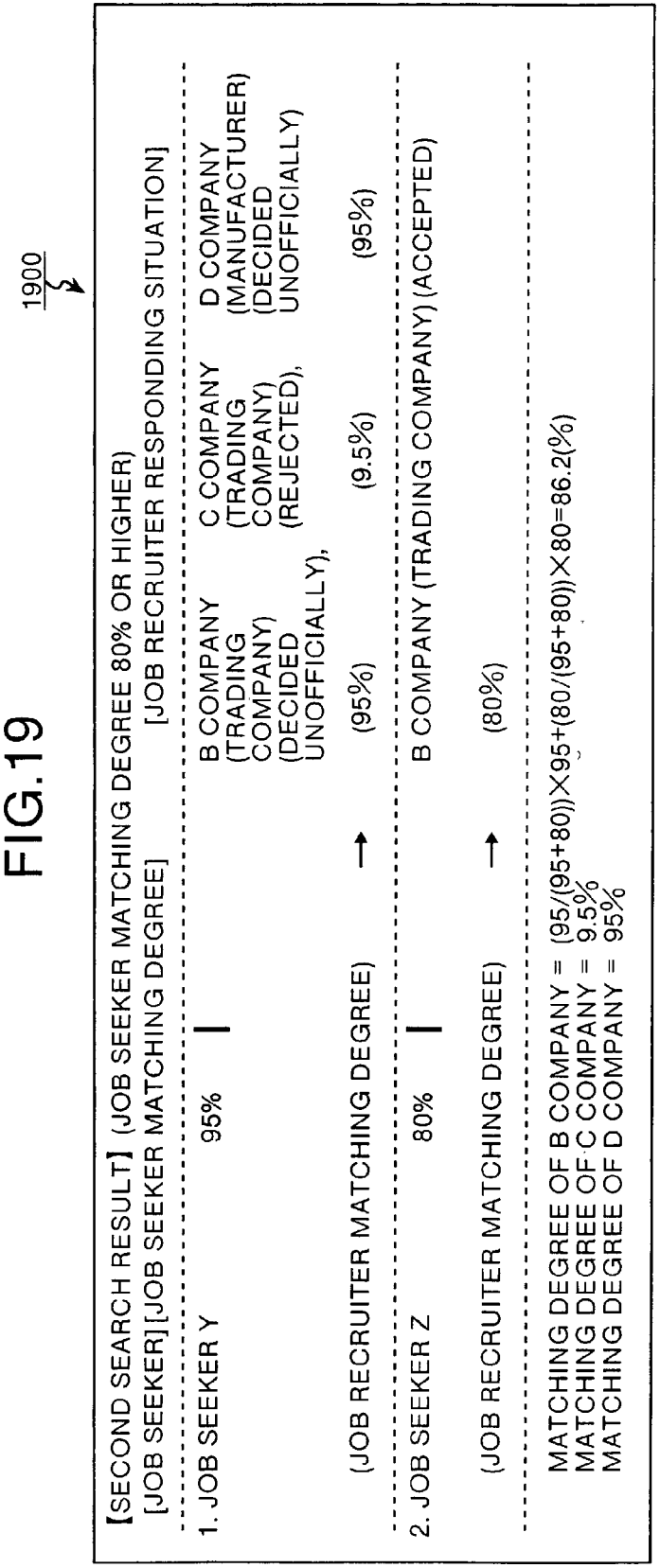
FIG. 19 is an explanatory diagram showing the contents of the search result of the second search processing.

Thereafter, the search result 1900 shown in FIG. 19 is stored as a temporary file, including the information for the job recruiter, type of business, job seeker matching degree, and job recruiter matching degree (step S1306). The job recruiter matching degree for each job recruiter is used for calculating the overall job recruiter matching degree later on.

Figure 20:
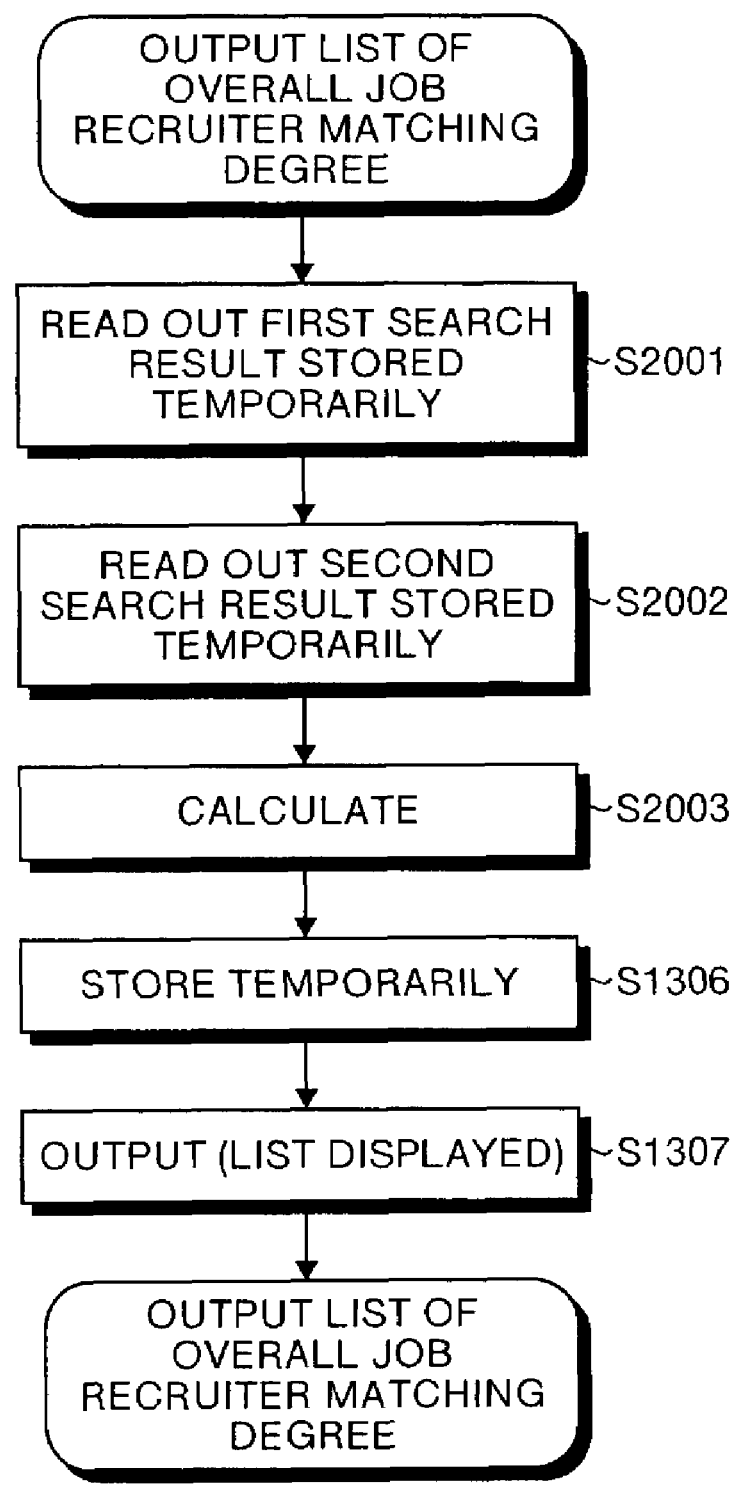
FIG. 20 is a flowchart showing the contents of output processing of a list of overall job recruiter matching degree (step S1305 to S1307)

The contents of list output processing of overall job recruiter matching degree (overall matching degree calculation processing at step S1305) will now be explained. FIG. 20 is a flowchart showing the contents of the list output processing of the overall job recruiter matching degree. In the flowchart shown, the first search result and the second search result stored in the temporary file are read out (step S2001, and step S2002). Leveling is carried out by multiplying the read-out result by a certain ratio, to calculate the overall job recruiter matching degree (step S2003).

The calculation method at step S2003 is as follows. At first, the ratio of priority of the first search result and the second search result is assumed to be "r1=40%" and "r2=60%". Then, the overall job recruiter matching degree of a job recruiter is calculated using the following equation (3), by designating the matching degree of each job recruiter in the first search result and the second search result as M1 and M2. However, a job recruiter existing only in the first search result or the second search result is not leveled by the following equation (3), and respective matching degree is set.

$$\text{(overall job recruiter matching degree of a certain job recruiter)} = M1 \times r1 + M2 \times r2 \quad (3)$$

The calculated result is as shown in the output contents of the overall job recruiter matching degree list 2100 shown in FIG. 21. The content is temporarily stored (step S1306). A list of the overall job recruiter matching degree is displayed based on the temporarily stored data (step S1307). FIG. 22 is an explanatory diagram showing one example of a search result display screen according to the first embodiment. In FIG. 22, reference numeral 2200 denotes a list of the overall job recruiter matching degree. In the list 2200 of the overall job recruiter matching degree, (1) shows the result of the first search, (2) shows the result of the second search, and (3) shows the result of the overall job recruiter matching degree.

In the above (1), by clicking on any company name in a display area 2201, corresponding job recruiter information is displayed. By clicking on an "apply" button 2202, the screen shifts to a screen for application to the respective job recruiter. In the above (2), by clicking on the extracted job seeker (job seeker Y) in a display area 2203, the whole or a part of the job application slip information about the job seeker Y is displayed. In this case, it is desired to apply masking to the information for keeping anonymity.

In (2) and (3), by clicking on any company name in a display area 2204 or 2206, corresponding note information is displayed. The "apply" button is the same as the "apply" button 2202. However, the "apply" buttons 2205 and 2207 are distinguishingly displayed from the other "apply" buttons, by changing the color and luminance of the button as compared with those of the other "apply" buttons. By doing such, it is possible to easily recognize a job recruiter having a lower employment possibility as compared with other job recruiters.

Figure 23:
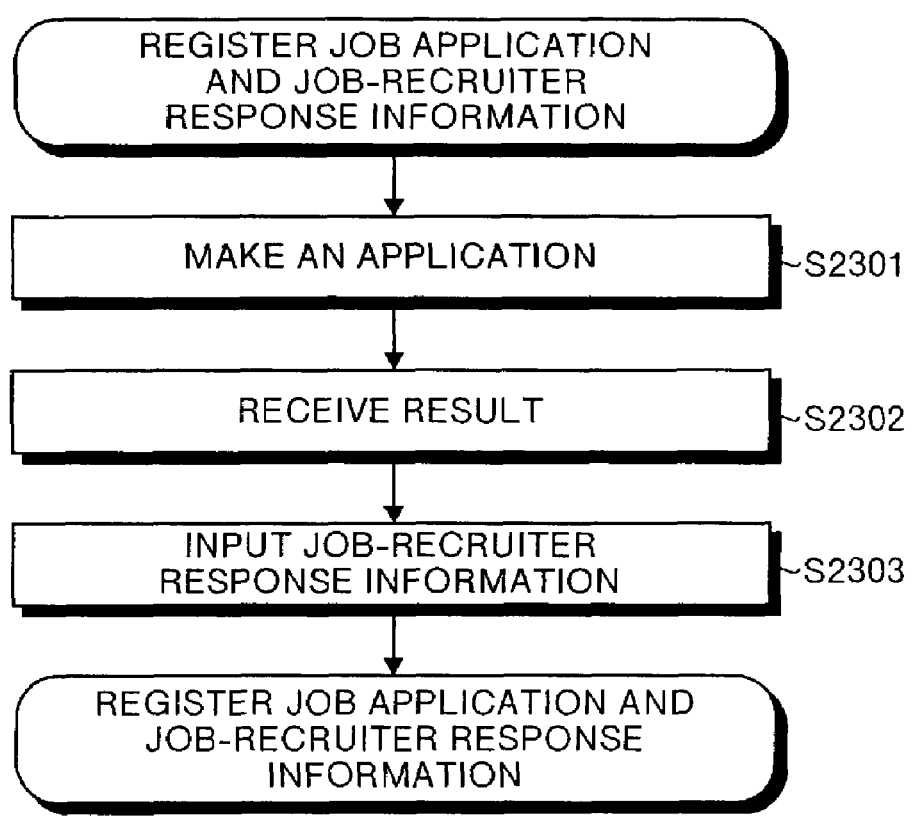
FIG. 23 is a flowchart showing the contents of processing for registering job application and job-recruiter response information (step S1003, step S1004)

Contents of Job Application Processing and Registration Processing for Job-recruiter Response Information:

The contents of the job application processing at step S1003 and of the registration processing for the job-recruiter response information at step S1004 will be explained below. FIG. 23 is a flowchart showing the contents of the job application processing and the job-recruiter response information registration processing (step S1003 and step S1004). In the flowchart, the job application processing is first carried out (step S2301). The job application processing is executed by clicking on the "apply" button displayed in the list 2200 of the overall job recruiter matching degree shown in FIG. 22. Specifically, the whole or a part of the job application slip information is transmitted to the job recruiter to be applied.

The result on the application is received (step S2302). Specifically, an employment notice 2400 shown in FIG. 24 or a rejection notice 2500 shown in FIG. 25 is received, and the received notice is displayed to the job seeker. FIG. 24 is an explanatory diagram showing one example of the employment notice, and FIG. 25 is an explanatory diagram showing one example of the rejection notice.

Figure 26:
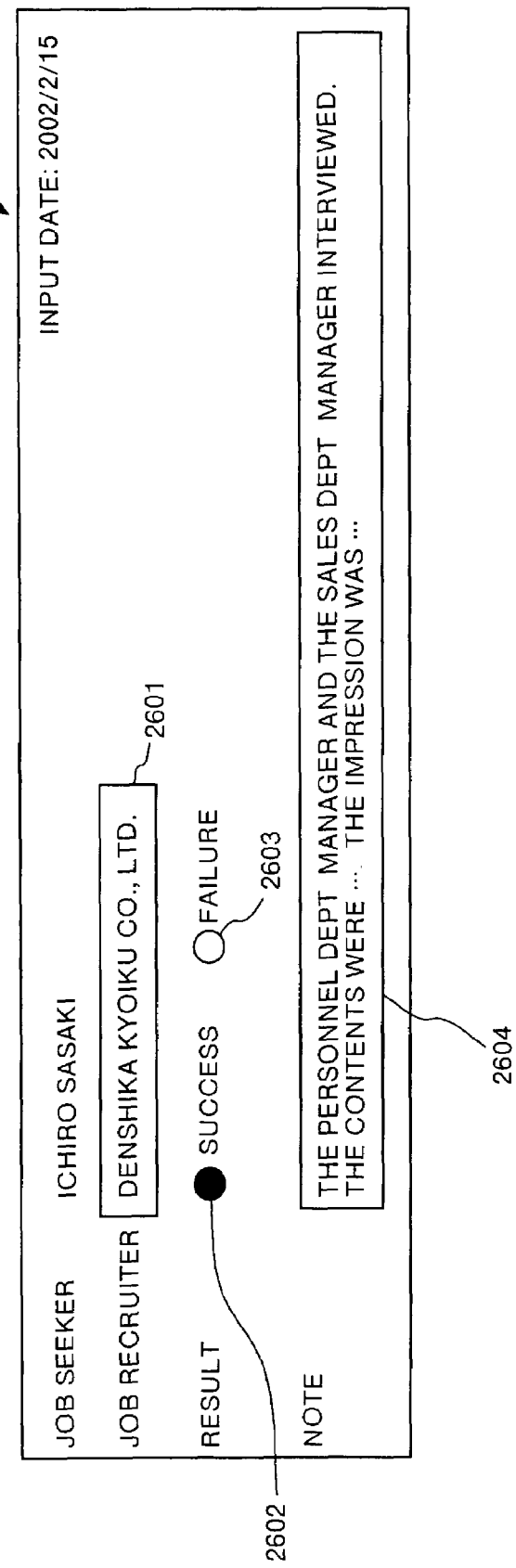
FIG. 26 is an explanatory diagram showing one example of input screen for the job-recruiter response information.

Thereafter, the job-recruiter response information is input (step S2303). The input processing of the job-recruiter response information can be performed according to an instruction in an input screen 2600 of the job-recruiter response information ("job-recruiter response information input screen 2600") shown in FIG. 26. In the job-recruiter response information input screen 2600, a job seeker and an input date are input in advance and displayed. The job seeker inputs the name of a job recruiter in a job-recruiter input box 2601, and selects either a radio button 2602 or 2603 for inputting the result, to thereby input the information for the result on employment.

Reference information such as the contents relating to the examination and employment judgment criteria, and impressions are input in a note input box 2604. Data input in each input box can be carried out using the keyboard 811 and the mouse 812 shown in FIG. 8. The job-recruiter response information for the job recruiter to whom the job seeker has applied may be registered at an optional timing, and for example, information for job recruiters to whom the job seekers applied in the past may be registered at the time of initial registration of the information for the corresponding job recruiter. The input job-recruiter response information is transmitted to the employment Web server 301, and registered in the job-recruiter response information DB 313.

Figure 27:
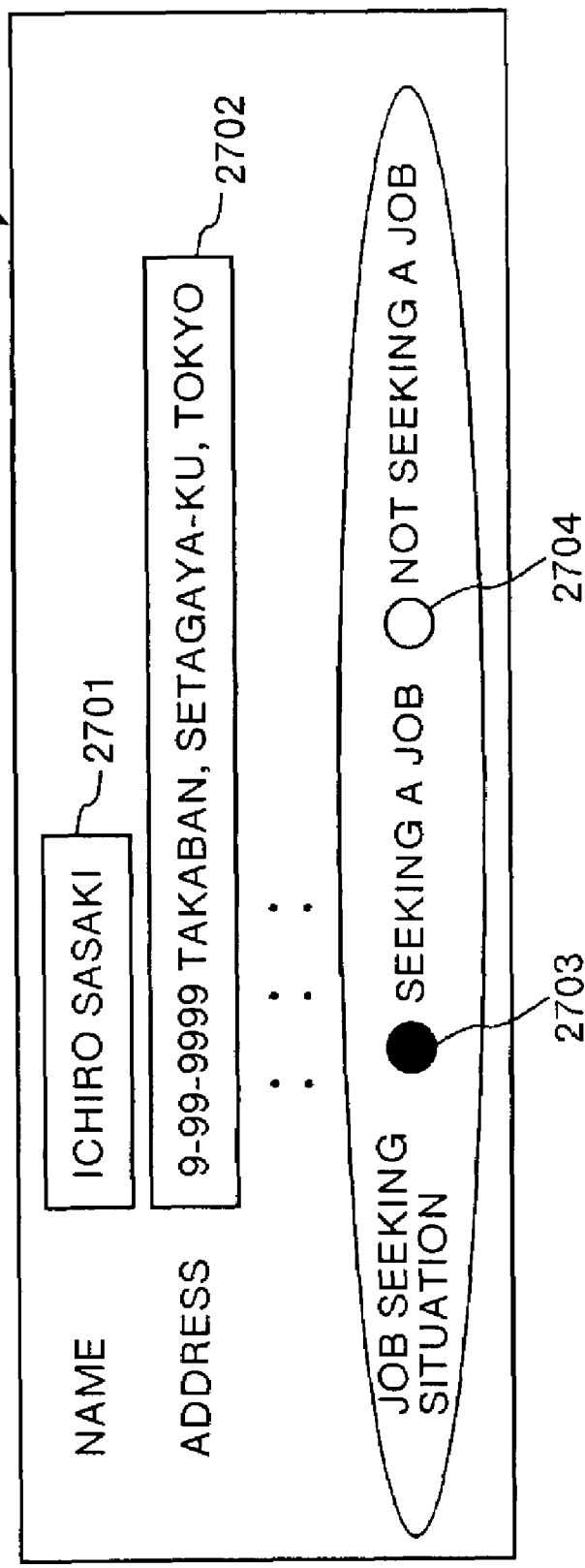
FIG. 27 is an explanatory diagram showing one example of input screen for job seeking situation (registration screen for job seeker information)

FIG. 27 is an explanatory diagram showing one example of a job seeking situation input screen (job seeker information registration screen). In FIG. 27, the job seeking situation input screen 2700 has input boxes 2701 and 2702 in which the name and address of the job seeker are input and radio buttons 2703 and 2704 for inputting the job seeking situation displayed thereon. The job seeking situation may be updated by the job seeker at an optional timing. Alternatively, it may be set so that when this system has not been used for more than a predetermined number of days, it is automatically changed to "not seeking a job".

As explained above, according to the first embodiment, the useful job recruiting information can be easily found, but cannot be found only by matching of the information for job application slips with the job recruiting information. Therefore, job seekers can make applications to a desired most suitable job recruiter based on the job application slips of their own. Further, job seekers can approach a wider range of job recruiter.

According to the first embodiment, since the job-recruiter response information includes the information for results on application of job seekers to job recruiters, the job seeker can get to know the situation about employment by the job recruiter before making an application. Further, since the possibility that the job recruiter may employ the job seeker is calculated, the job seeker can get to know the prospects of employment more specifically, by the obtained employment possibility.

In a second embodiment of this invention, the job recruiting support method, the job recruiting support program, and the job recruiting support apparatus will be explained.

Figure 28:
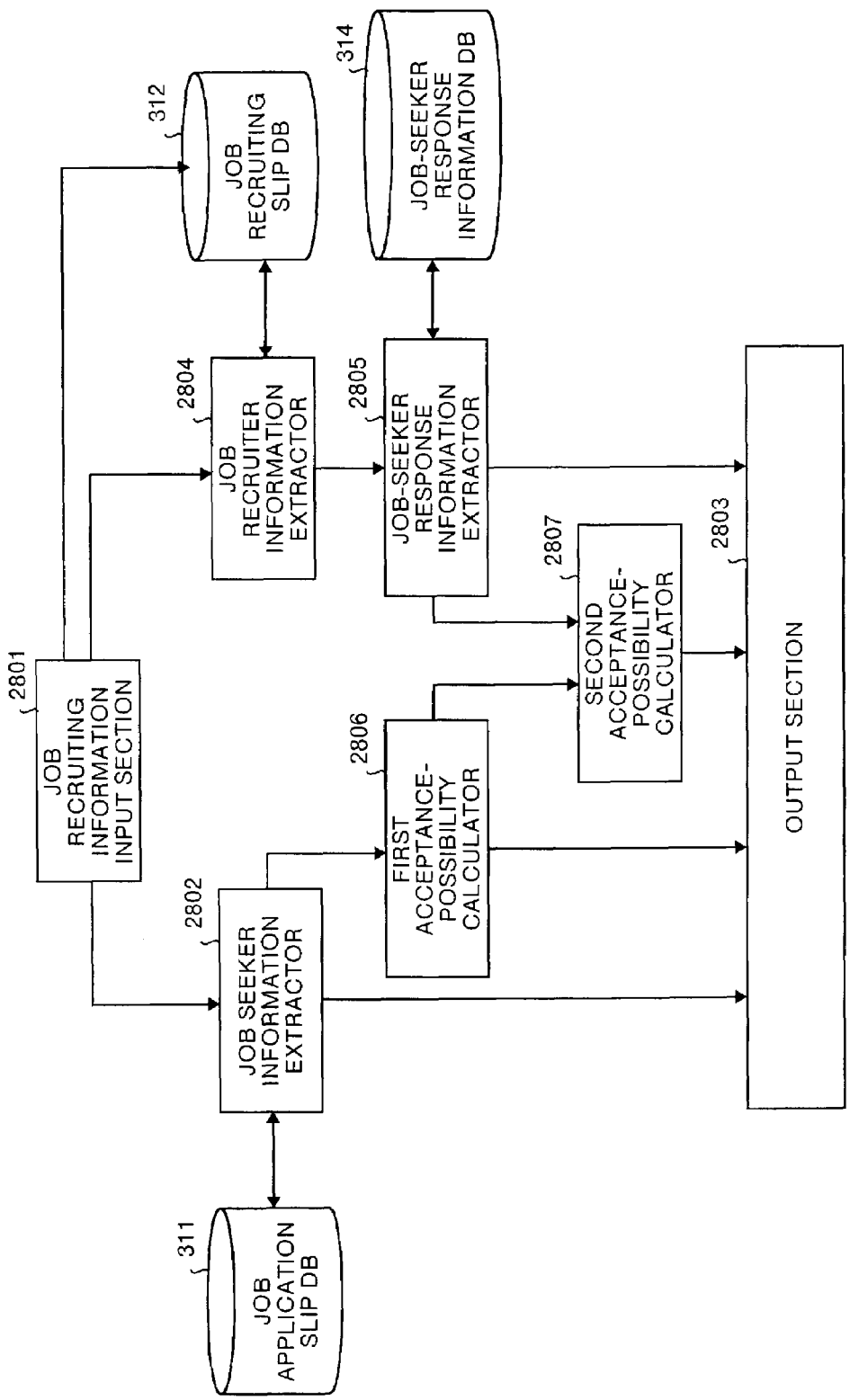
FIG. 28 is a block diagram showing one example of a functional structure of a Web server for employment, being a job recruiting support apparatus according to the second embodiment.

Functional Structure of Employment Web Server 301:

The functional structure of the employment Web server 301, being the job recruiting support apparatus according to the embodiment of this intention will be explained below. FIG. 28 is a block diagram showing one example of the functional structure of the employment Web server 301. In FIG. 28, the employment Web server 301 comprises a job recruiting information input section 2801, a job seeker information extractor 2802, an output section 2803, a job recruiting information extractor 2804, a job-seeker response information extractor 2805, a first acceptance-possibility calculator 2806, and a second acceptance-possibility calculator 2807.

The job recruiting information input section 2801 inputs information for the job recruiting condition of a job recruiter. The job recruiter is normally an enterprise (company) who searches information for a desired job seeker from the information for job seekers. The information for the job recruiting condition stands for the contents described in a job recruiting slip 3100 shown in FIG. 31 described later. The details of the information for the job recruiting condition will be described later. The information for the job recruiting condition of a job recruiter input through the job recruiting information input section 2801 is stored in the job recruiting slip DB 312.

Specifically, the job recruiting information input section 2801 realizes its function by the I/F 809 shown in FIG. 8 as an example. The function may be realized by the keyboard 811, or the function of the job recruiting information input section 2801 may be realized by inputting a job recruiting slip written on paper by the scanner 813, and digitizes the image of the input job recruiting slip, using an OCR function (not shown).

The job seeker information extractor 2802 extracts the information for one job seeker or information data for job seekers from the job application slip DB 311, based on the information input through the job recruiting information input section 2801. The detailed procedure for search and extraction (matching) of the information will be explained later.

The output section 2803 outputs the job seeker information extracted by the job seeker information extractor 2802. Here, output of the information includes transmitting the information to another information processing unit (including terminal units 302 and 303), for example, via the network 300, registering the information to the employment Web server 301 or predetermined URLs of other servers, so that the information can be read by other information processing units via the Internet, displaying the information on a display screen, or printing the information.

Specifically, the output section 2803 realizes its function by the CPU 801 which executes a program stored in the ROM 802, the RAM 803, the HD 805, or the FD 807 shown in FIG. 8. Further, the output section 2803 may realize its function by the display 808 and the printer 814 shown in FIG. 8.

The job recruiting information extractor 2804 extracts the information for job recruiting conditions of persons other than the job recruiter, whose contents are similar to those of the information input by the input section 2801, from the job recruiting slip DB 312. The extracted information may be one or plural. The detailed procedure for search and extraction (matching) of the similar information will be explained later.

The job-seeker response information extractor 2805 extracts job-seeker response information that relates to respective responses of the job recruiter to the persons whose information corresponds to the information for the job recruiting conditions extracted by the job recruiting information extractor 2804, from the job-seeker response information DB 314. The extracted information may be all or a part of pieces of the information. In other word, when there are many job-seeker response information to the persons whose information corresponds to the information for the extracted job recruiting condition, only the part thereof may be extracted, without extracting all the pieces of the information.

The case where the extracted information may be all or a part of the pieces of the information includes a case where the whole or apart of apiece of the job-seeker response information. Further, the job-seeker response information may include the information for the response of the job seeker to the recruiting by the job recruiter. The output section 2803 outputs either one or both of the information for the job seeker extracted by the job seeker information extractor 2802, and the job-seeker response information extracted by the job-seeker response information extractor 2805.

The first acceptance-possibility calculator 2806 calculates the possibility that the job recruiter may employ the job seeker, based on the information extracted by the job seeker information extractor 2802. The possibility of the acceptance means the possibility that the job seeker may show his/her intention of joining the company or may reject, when the job recruiter gives employment guarantee to the job seeker. This depends on how the job seeker has an interest in the job recruiter. The detailed procedure of calculating the possibility will be described later. The output section 2803 may further output the information for the acceptance possibility calculated by the first acceptance-possibility calculator 2806.

The second acceptance-possibility calculator 2807 calculates the possibility that the job seeker may accept a job to be offered by the job recruiter, based on the information for the acceptance possibility calculated by the first acceptance-possibility calculator 2806, and the information for the response of the job seeker to the recruiting by the job recruiter extracted by the job-seeker response information extractor 2805. The detailed procedure of the calculation will be described later. The output section 2803 may further output the information for the acceptance possibility calculated by the second acceptance-possibility calculator 2807.

Specifically, each component of the job seeker information extractor 2802, the job recruiting information extractor 2804, the job-seeker response information extractor 2805, the first acceptance-possibility calculator 2806, and the second acceptance-possibility calculator 2807 realizes its function by the CPU 801 which executes the program stored in the ROM 802, the RAM 803, the HD 805, or the FD 807 shown in FIG. 8.

Figure 29:
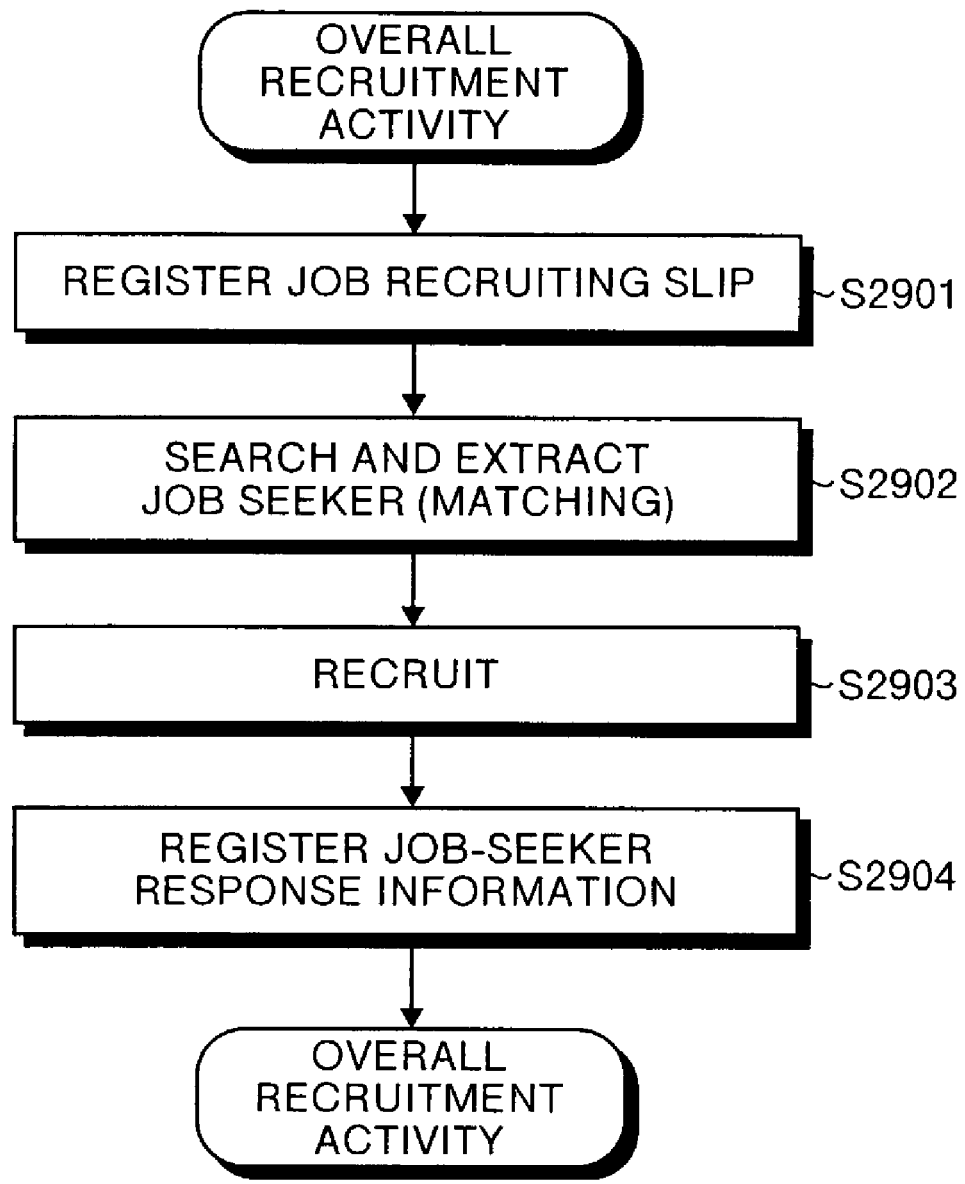
FIG. 29 is a flowchart showing the contents of the overall recruitment based on the job recruiting support method according to the second embodiment.

Contents of the Overall Recruitment:

A series of flow of the overall recruitment will now be explained. FIG. 29 is a flowchart showing the contents of the overall recruitment in the job recruiting support method according to the second embodiment. In the flowchart, at first, a job recruiter (who wants to recruit) registers a job recruiting slip (step S2901). The specific content of registration of the job recruiting slip will be described later (see FIG. 30 and FIG. 31).

Search and extraction (matching) of a job seeker (who wants to apply for a job) are carried out based on the registered job recruiting slip (step S2902). The specific content of matching will be described later (see FIG. 32 to FIG. 39). The job recruiter (who wants to recruit) recruits the job seeker (who wants to apply for a job) (step S2903). The specific content of recruitment will be described later (see FIG. 40). The job-seeker response information is registered (step S2904) to thereby finish the series of recruitment.

Figure 30:
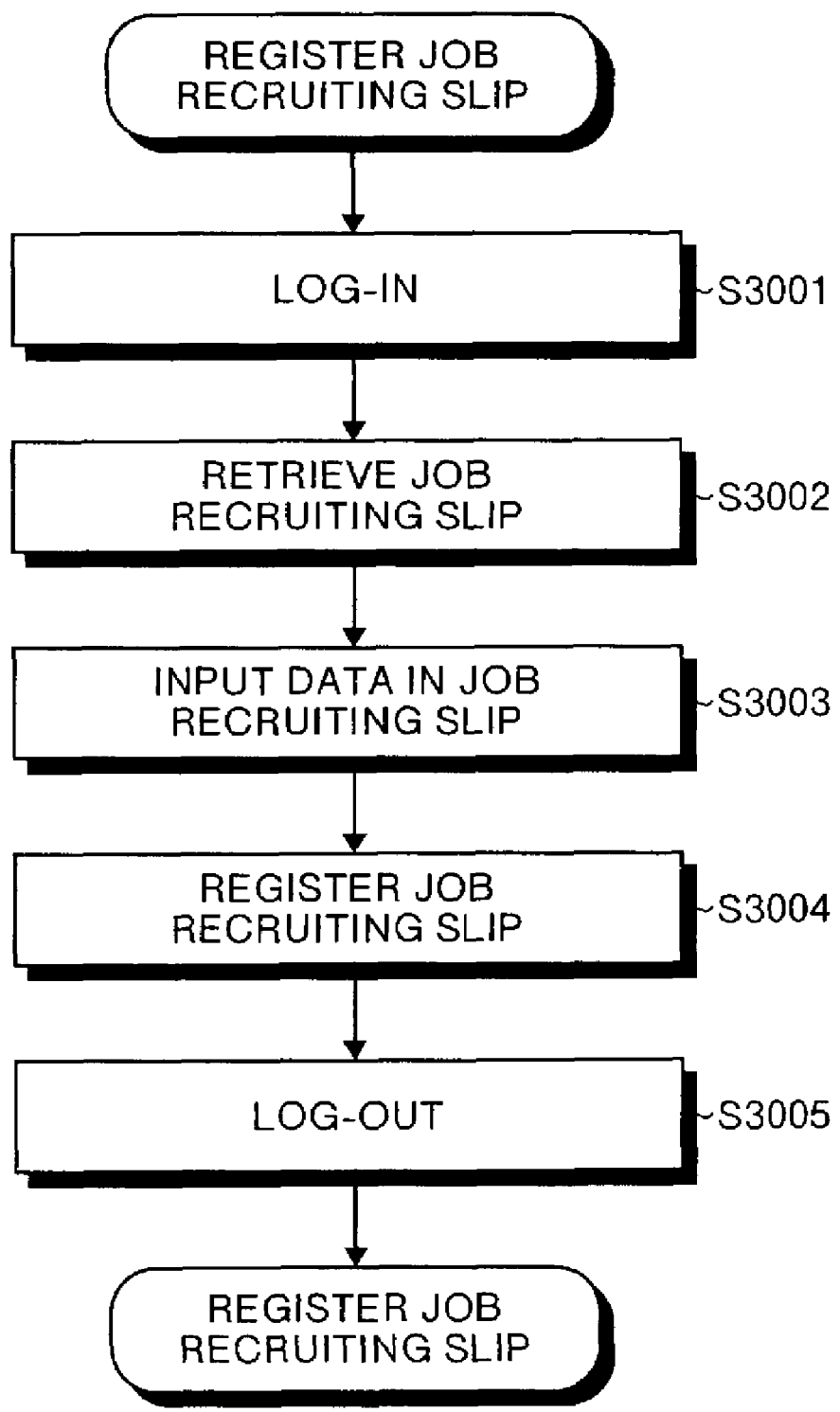
FIG. 30 is a flowchart showing the contents of registration processing for the job recruiting slip (step S2901)

Contents of the Processing for Job Recruiting Slip Registration:

The contents of the job recruiting slip registration processing at step S2901 will be explained. FIG. 30 is a flowchart showing the contents of the processing for job recruiting slip registration in the job seeking support method according to the second embodiment. In the flowchart, at first, log-in is carried out to the job seeking and job recruiting support system (step S3001), and then a job recruiting slip 3100 as shown in FIG. 31 is retrieved (step S3002). The retrieved job recruiting slip 3100 is displayed on the display 808 shown in FIG. 8.

Necessary items are input in the job recruiting slip 3100 using the keyboard 811 and the mouse 812 (step S3003). The job recruiting slip 3100 shown in FIG. 31 shows the state that all items are input. Thereafter, the job recruiting slip 3100 is registered (step S3004), and log-out is performed (step S3005). Thereby, registration processing of the job recruiting slip is finished. In this manner, the registration of the job recruiting slip may be performed by uploading a text-base file prepared in accordance with a specified format, in addition to registering it from the input form of a browser.

Figure 32:
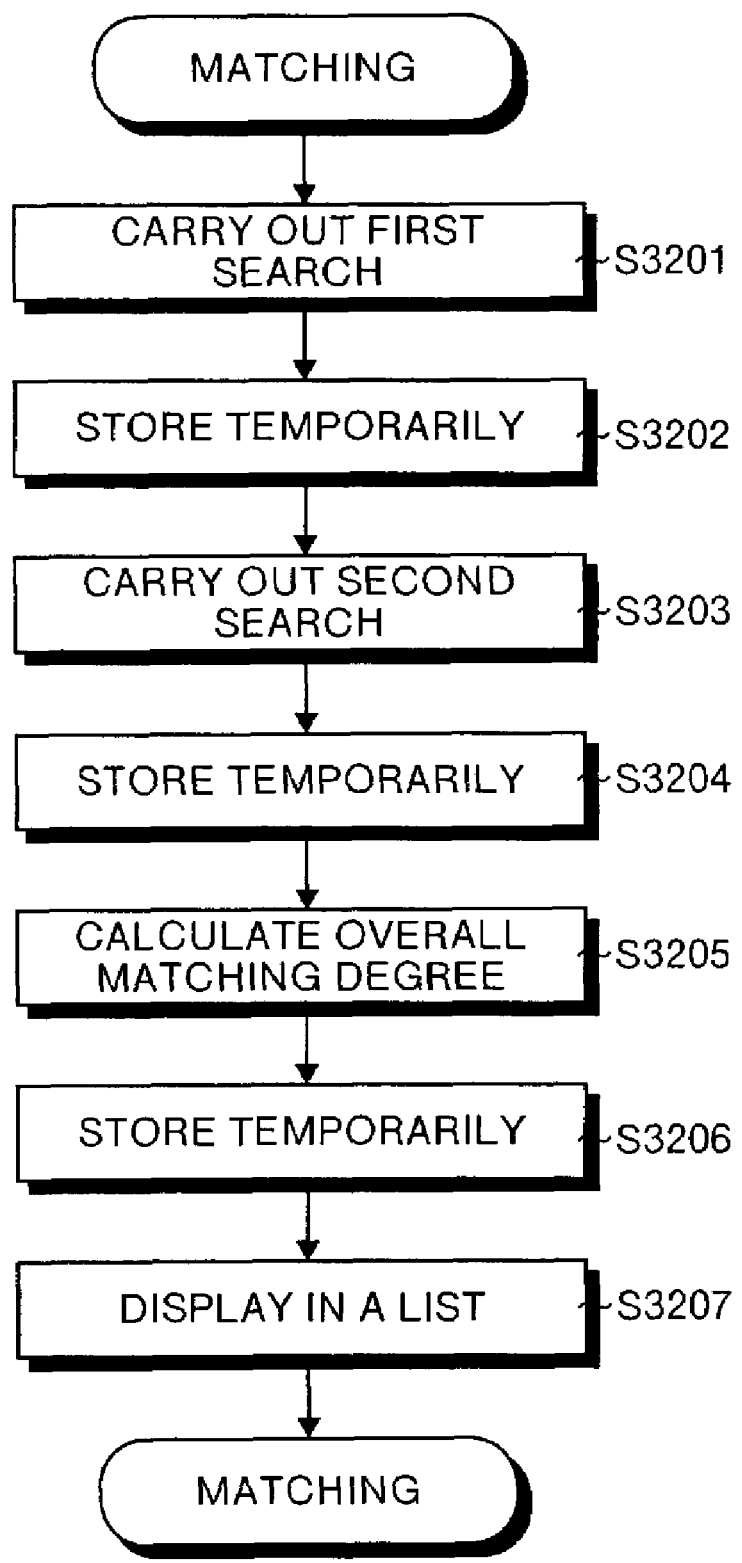
FIG. 32 is a flowchart showing the contents of matching processing (step S2902)

Contents of the Matching Processing:

The contents of the matching processing at step S2902 will be explained below. FIG. 32 is a flowchart showing the contents of the matching processing in the job recruiting support method according to the second embodiment of this invention. In the flowchart, first search is carried out (step S3201). The result is temporarily stored (step S3202).

Second search is then carried out (step S3203). The result is also temporarily stored (step S3204). Thereafter, the overall matching degree is calculated (step S3205), and the result is also temporarily stored (step S3206). The temporarily stored results are displayed in a list form (step S3207).

Figure 33:
FIG. 33 is a flowchart showing the contents of first search processing (step S3201)

FIG. 33 is a flowchart showing the contents of the first search processing (step S3201). At first, matching in contents is carried out between the job recruiting slip of a job recruiter (who wants to recruit) and all job application slips registered in the job application slip DB 311 (step S3301). An algorithm such as word matching or text mining in the known art may be used in the matching method. The specific example of matching is the same as the contents explained in the first embodiment with reference to FIG. 15, and hence the explanation thereof is omitted.

Subsequently, a job seeker having a high matching degree is extracted, and the matching degree of the job seeker is calculated (step S3302). Specifically, as the matching result, one having a certain value (for example, 80%) or higher is extracted in descending order of the matching degree. For example, it is assumed herein that job seekers X, Y, and Z (any of them wants to apply to a trading company) most suitable for the job recruiter P are extracted. The search result shown in FIG. 34 is stored as a temporary file, including the information for the job seekers, type of business and job seeker matching degree (step S3202). The job seeker matching degree for each job seeker is used for calculating the overall job seeker matching degree later.

Figure 35:
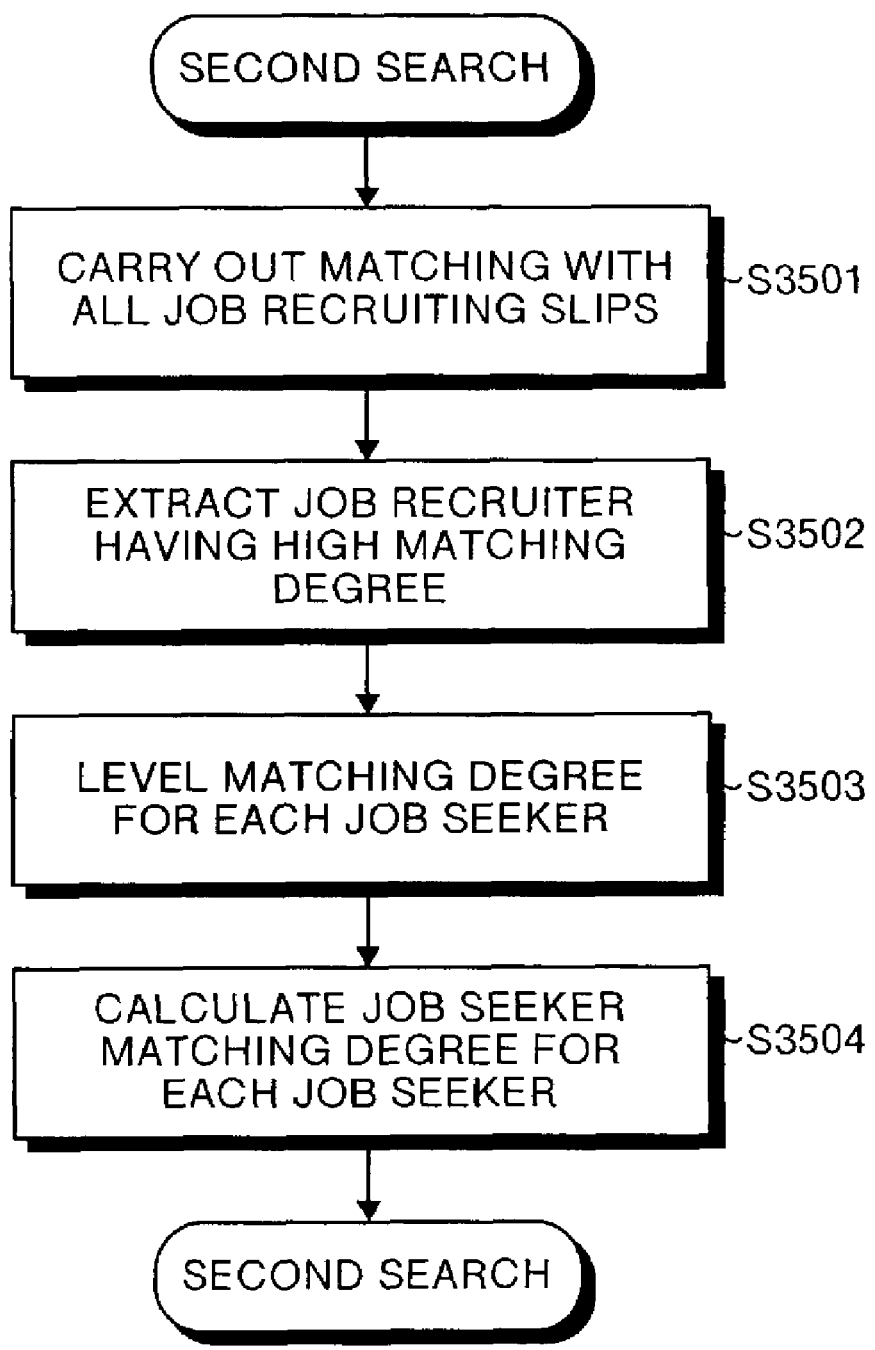
FIG. 35 is a flowchart showing the contents of second search processing (step S3203)

FIG. 35 is a flowchart showing the contents of second search processing (step S3203). At first, matching in contents is carried out between the job recruiting slip of a job recruiter (who wants to recruit) and all job recruiting slips registered in the job recruiting slip DB 312 (step S3501). An algorithm such as word matching or text mining in the known art may be used in the matching method. The specific example of matching is the same as the contents explained in the first embodiment with reference to FIG. 18, and hence the explanation thereof is omitted.

Subsequently, a job seeker having a high matching degree is extracted (step S3502). Specifically, as the matching result, one having a certain value (for example, 80%) or higher is extracted in descending order of the matching degree. By this search processing, another job recruiter similar to the job recruiter P is extracted, and the information of this job recruiter can be effectively used as described below. For example, it is assumed herein that a job recruiter Q similar to the job recruiter P is extracted by the first search processing (step S3201). It is also assumed that the job recruiter Q recruited Mr. Y (who wants to apply to a trading company) (having an interest) Mr. Z (who wants to apply to a trading company) (having no interest), and Mr. W (who wants to apply to a manufacturer) (having an interest) in the past, and the results are Mr. Y: having an interest, Mr. Z: having no interest, and Mr. W: having an interest. In this case, it can be judged that, of Mr. X, Mr. Y, and Mr. Z extracted by the job recruiter P in the first search processing, Mr. Y has a high interest, and Mr. Z has a low interest. It is also easily recognized that Mr. W, who wants to apply to other types of business and has not been extracted by the first search processing, has a high interest.

Specifically, the calculation of the job seeker matching degree for each job seeker is carried out in the following manner. That is, a coefficient of degree of interest is set beforehand. A high value is set to the job seeker who is given the employment guarantee, and a low value is set to the job seeker who is rejected. Here, it is assumed to be 100% in the case of the employment guarantee, and 10% in the case of the rejection. Then the job seeker matching degree is calculated for each job seeker. The job seeker matching degree can be expressed by the following equation (4).

$$\text{(job seeker matching degree)} = \text{(job recruiter matching degree)} \times \text{(coefficient of degree of interest)} \quad (4)$$

Leveling is performed in accordance with the ratio of the job recruiter matching degree for each job seeker (step S3503), and the job seeker matching degree is calculated for each job seeker, using the following equation (5).

$$\text{(job seeker matching degree of a certain job seeker)} = \sum_{k=1}^{n} \text{(matching degree of job recruiter } k\text{)}/\text{(total matching degree of all job recruiters)} \times \text{(job seeker matching degree in a column of the job recruiter } k\text{)} \quad (5)$$

Figure 36:
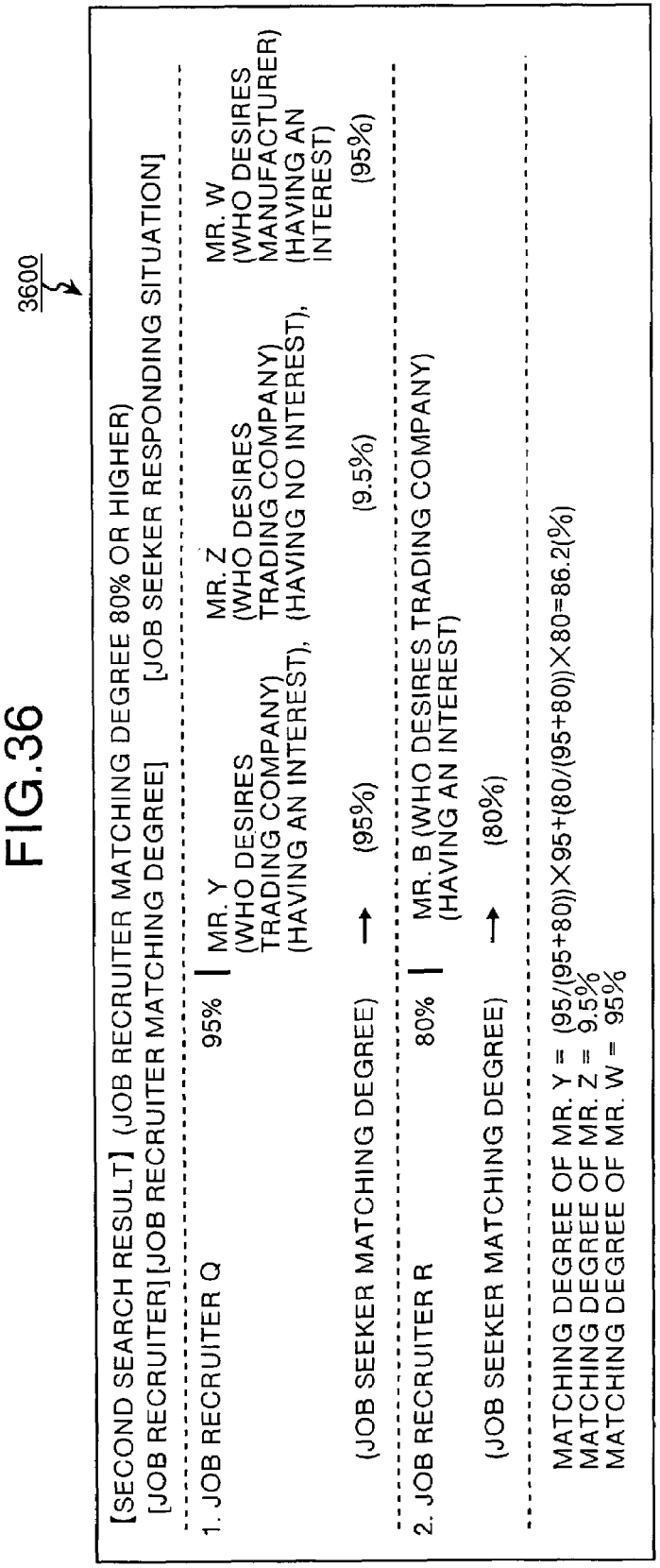
FIG. 36 is an explanatory diagram showing the contents of the search result of the second search.

Thereafter, the search result 3600 shown in FIG. 36 is stored as a temporary file, including the information for the job seeker, type of business, job recruiter matching degree, and job seeker matching degree (step S3206). The job seeker matching degree for each job seeker is used for calculating the overall job seeker matching degree later.

The contents of the output processing of overall job seeker matching degree in a list form (overall matching degree calculation processing at step S3205) will now be explained. FIG. 37 is a flowchart showing the contents of the output processing of the overall job seeker matching degree in the list form. In the flowchart, the first search result and the second search result stored in the temporary file are read out (step S3701, and step S3702). Leveling is carried out by multiplying the read-out result by a certain ratio, to calculate the overall job seeker matching degree (step S3703).

The calculation method at step S3703 is as follows. At first, the ratio of priority in the first search result and the second search result is assumed to be "r1=40%" and "r2=60%". Then, the overall job seeker matching degree of the job seeker is calculated using the following equation (6), by designating the matching degree of each job seeker in the first search result and the second search result as M1 and M2. However, a job seeker existing only in the first search result or the second search result is not leveled by the following equation (6), and respective matching degree is set.

$$(\text{overall job seeker matching degree of a certain job seeker}) = M1 \times r1 + M2 \times r2 \quad (6)$$

The calculated result is as shown in the output content of the list 3800 of the overall job seeker matching degree shown in FIG. 38. The content is temporarily stored (step S3206). A list of the overall job seeker matching degree is displayed based on the temporarily stored data. FIG. 39 is an explanatory diagram showing one example of a search result display screen according to the second embodiment of this invention. In FIG. 39, reference numeral 3900 denotes a list of the overall job seeker matching degree. In the list 3900, (1) shows the result of the first search, (2) shows the result of the second search, and (3) shows the result of the overall job seeker matching degree.

In the above (1), by clicking on any person's name in a display area 3901, respective job seeker information is displayed. By clicking on a "recruiting" button 3902, the screen shifts to a recruiting screen for the respective job seeker. In the above (2), by clicking the extracted job recruiter (job recruiter Q) in a display area 3903, the whole or a part of the job recruiting slip information of the job recruiter Q is displayed.

In (2) and (3), by clicking any person's name in a display areas 3904 or 3906, corresponding note information is displayed. The "recruiting" button is similar to the "recruiting" button 3902. However, the "recruiting" buttons 3905 and 3907 are distinguished from other "recruiting" buttons, by displaying different color or luminance of the button as compared with the other "recruiting" buttons. By doing such, a job seeker having a low interest can be easily recognized as compared with other job seekers.

Contents of Recruiting Processing and Job-Seeker Response Information Registration Processing:

The contents of the recruiting processing at step S2903 and the job-seeker response information registration processing at step S2904 will be explained below. FIG. 40 is a flowchart showing the contents of the recruiting processing and the job-seeker response information registration processing (step S2903 and step S2904). In the flowchart, the recruiting processing is first carried out (step S4001). The recruiting processing is executed by clicking the "recruiting" button displayed in the list 3900 of the overall job seeker matching degree shown in FIG. 39. Specifically, the whole or a part of the job recruiting slip information is transmitted to the job seeker to be recruited.

The result on recruiting is received (step S4002), and the job-seeker response information is input (step S4003) The input processing of the job-seeker response information can be carried out according to instruction on an input screen 4100 for job-seeker response information ("job-seeker response information input screen") shown in FIG. 41. In the input screen 4100, a job recruiter and a date are input and displayed beforehand. The job recruiter inputs the name of job seeker in the job seeker input box 4101, and selects either a radio button 4102 or 4103 for inputting the result, to thereby input the information for the interest.

Any comments relating to the job seeker is input to a note input box 4104. Data can be input in each input box using the keyboard 811 and the mouse 812 shown in FIG. 8. The job-seeker response information for the recruited job seeker may be registered at an optional timing, and for example, information for job seekers recruited in the past may be registered at the time of initial registration of the information for the corresponding job seeker. The input job-seeker response information is transmitted to the employment Web server 301, and registered in the job-seeker response information DB 314.

Figure 42:
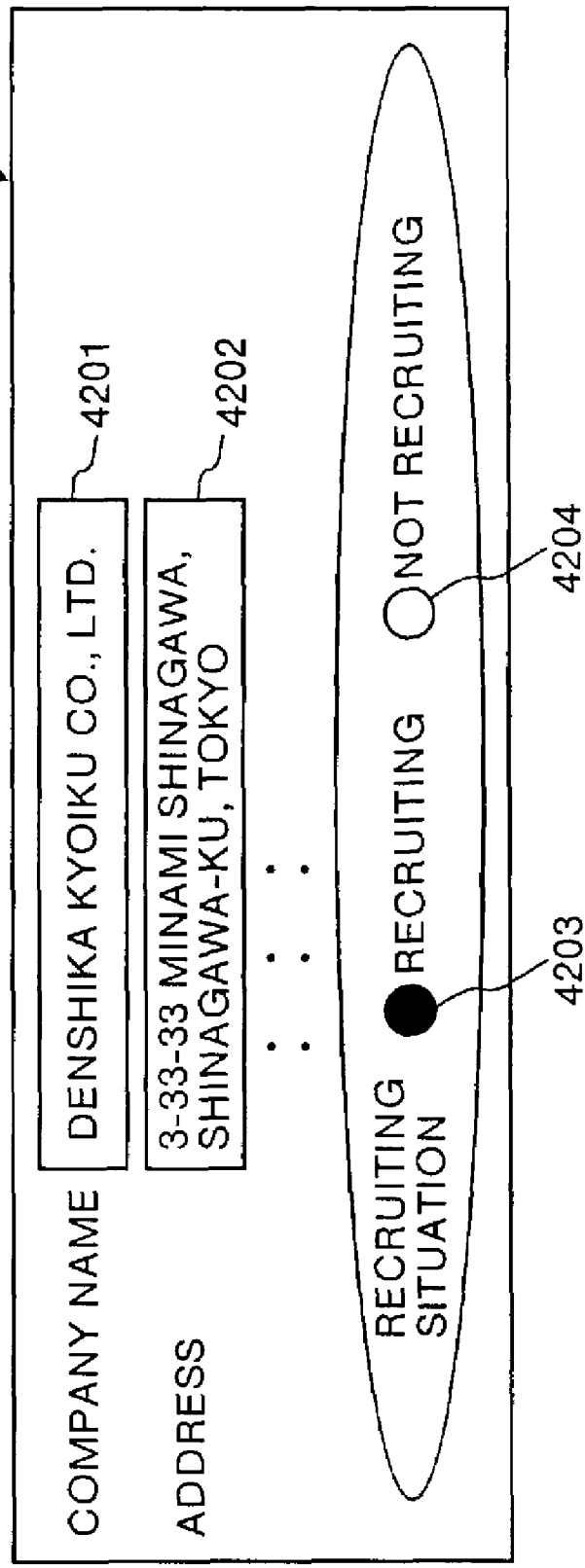
FIG. 42 is an explanatory diagram showing one example of input screen for recruiting situations (registration screen for job recruiter information).

FIG. 42 is an explanatory diagram showing one example of recruiting situation input screen (registration screen for job recruiter information). In FIG. 42, the recruiting situation input screen 4200 has input boxes 4201 and 4202 for inputting the company name and address of the job recruiter, and radio buttons 4203 and 4204 for inputting the recruiting situation displayed thereon. The recruiting situation may be updated by the job recruiter at an optional timing. Alternatively, the recruiting situation may be set so that it is automatically changed to "not recruiting" when this system has not been used for more than a predetermined number of days.

As explained above, according to the second embodiment, the useful job seeker information can be easily found, which cannot be found only by matching of the information of job recruiting slips with the job seeking information. Therefore, job recruiters can recruit a desired most suitable job seeker based on the job recruiting slip of their own. Further, job recruiters can approach a wider range of job seekers.

According to the second embodiment, since the job-seeker response information includes the information for the results on recruiting of the job recruiter to the job seeker, the job recruiter can get to know the possibility as to whether the job seeker may be interested in the company, before recruiting. Further, since the degree of interest of the job seeker in the job recruiter is calculated, the job recruiter can get to know the prospects of employment of the job seeker more specifically, by the degree of interest.

The job seeking support method and the job recruiting support method in the embodiments may be a computer readable program prepared in advance, and the program is realized by being executed on a computer such as a personal computer and a work station. This program is recorded in a computer readable recording medium, such as a hard disk (HD), a flexible disk (FD), a CD-ROM, an MO, or a DVD, and is read out from the recording medium and executed on the computer. This program may be a transmission medium capable of distribution via a network such as the Internet.

As explained above, according to this invention, useful job recruiting information can be easily found, which cannot be found only by matching of the information of the job application slips with the job recruiting information. Accordingly, a job seeker can make an application for a job to a desired most suitable job recruiter based on his/her own job application slip, and can make an approach to a wider range of job recruiters. As a result, it is possible to obtain the job seeking support method, the job seeking support program, and the job seeking support apparatus, by which job seeking activities can be made more efficiently.

According to this invention, useful job seeker information can be easily found, which cannot be found only by matching of the information of the job recruiting slips with the job seeking information. Accordingly, a job recruiter can recruit a desired most suitable job seeker based on the own job recruiting slip, and can make an approach to a wider range of job seekers. As a result, it is possible to obtain the job recruiting support method, the job recruiting support program, and the job recruiting support apparatus, by which recruitment can be made more efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A job seeking support method performed by a computer, by which a job seeker searches information on a desired job recruiter from information on a plurality of job recruiters, the method comprising:
    inputting job seeking conditions of the job seeker from a user interface of the computer;
    automatically extracting, by the computer, job applications of persons other than the job seeker from a memory, if the job applications are based on job seeking conditions similar to the job seeking conditions of the job seeker;
    extracting job recruiter responses of job recruiters related to the extracted job applications from the memory; and
    outputting the extracted job recruiter responses including information on the job recruiters by displaying on the display of the computer, to enable the job seeker to select the desired job recruiter.

2. The job seeking support method according to claim 1 wherein any job recruiter response includes information on a result of a respective job application based on the job seeking conditions similar to the job seeking conditions of the job seeker.

3. A job seeking support method performed by a computer by which a job seeker searches information on a desired job recruiter from information on job recruiters, the method comprising:
    inputting job seeking conditions of the job seeker using a user interface of the computer;
    extracting information on job recruiters from a memory, based on the input job seeking conditions;
    automatically extracting, by the computer, job applications of persons other than the job seeker from the memory, if the job applications are based on job seeking conditions similar to the input job seeking conditions of the job seeker;
    extracting job recruiter responses of the job recruiters to the job applications from the memory; and
    outputting at least one of the extracted information on the job recruiters and the extracted job recruiter responses on a display of the computer, to enable the job seeker to select the desired job recruiter.

4. The job seeking support method according to claim 3, wherein any job recruiter response includes information on a result of a respective job application.

5. The job seeking support method according to claim 3, further comprising:
    calculating a possibility that a job recruiter may employ the job seeker, based on the extracted information on the job recruiter, wherein
    the outputting includes outputting the calculated possibility of employment.

6. The job seeking support method according to claim 3, further comprising:
    a first employment-possibility calculation calculating a first possibility that a job recruiter may employ the job seeker, based on the extracted information on the job recruiter; and
    a second employment-possibility calculation calculating a second possibility that the job recruiter may employ the job seeker, based on the calculated first possibility and the information on results of job applications of the job seekers to the job recruiters, wherein
    the outputting includes outputting the second possibility.

7. A job seeking support method performed on a computer, by which a job seeker searches information on a desired job recruiter from information on job recruiters, the method comprising:
    inputting job seeking conditions of the job seeker using a user interface of the computer;
    automatically extracting, by the computer, job applications of persons other than the job seeker from a memory, if the job applications are based on job seeking conditions similar to the input job seeking conditions of the job seeker;
    extracting job recruiter responses related to the job applications from the memory;
    extracting information on job recruiters from the memory, based on the input job seeking conditions; and
    outputting at least one of the extracted job recruiter responses and the extracted information on the job recruiters, on a display of the computer, to enable the job seeker to select the desired job recruiter.

8. The job seeking support method according to claim 7, wherein any job recruiter response includes information on a result of a respective job application.

9. The job seeking support method according to claim 7, further comprising:
    calculating a possibility that a job recruiter may employ the job seeker, based on the extracted information for the job recruiter, wherein
    the outputting includes outputting the calculated possibility of employment.

10. The job seeking support method according to claim 7, further comprising:
    a first employment-possibility calculation calculating a first possibility that a job recruiter may employ the job seeker, based on the extracted information on the job recruiter; and
    a second employment-possibility calculation calculating a second possibility that the job recruiter may employ the job seeker, based on the calculated first possibility and the information on results of a respective job application of the job seekers to the job recruiters, wherein
    the outputting includes outputting the second possibility of employment.

11. A job recruiting support method performed on a computer, by which a job recruiter searches information on a desired job seeker from information on a plurality of job seekers, the method comprising:

inputting job recruiting conditions of the job recruiter from a user interface of the computer;

automatically extracting, by the computer, job recruiting searches of persons other than the job recruiter from a memory, if the job recruiting searches are based on job recruiting conditions similar to the input job recruiting conditions of the job recruiter;

extracting job seeker responses related to the extracted job recruiting searches from the memory; and outputting the extracted job seeker responses on a display of the computer, to enable the job recruiter to select the desired job seeker.

12. The job recruiting support method according to claim 11, wherein any job seeker response includes a result of a respective recruiting search.

13. A job recruiting support method performed by a computer by which a job recruiter searches information on a desired job seeker from information on job seekers, the method comprising:

inputting job recruiting conditions of the job recruiter from a user interface of the computer;

extracting information on job seekers from a memory, based on the input job recruiting conditions;

automatically extracting, by the computer, job recruiting searches of persons other than the job recruiter from the memory, if the job recruiting searches are based on job recruiting conditions similar to the input job recruiting conditions of the job recruiter;

extracting job seeker responses to the job recruiting searches from the memory; and outputting at least one of the extracted information on the job seekers and the extracted job seeker responses on a display of the computer, to enable the job recruiter to select the desired job seeker.

14. The job recruiting support method according to claim 13, wherein any job seeker response includes information on a result of the respective job recruiting search.

15. The job recruiting support method according to claim 13, further comprising:

calculating a possibility that a job seeker may accept a job to be offered by the job recruiter, based on the extracted information for the job seeker, wherein the outputting includes outputting the calculated possibility of acceptance.

16. The job seeking support method according to claim 13, further comprising:

a first acceptance-possibility calculation calculating a first possibility that a job seeker may accept a job to be offered by the job recruiter, based on the extracted information on the job seeker; and a second acceptance-possibility calculation calculating a second possibility that the job seeker may accept the job to be offered by the job recruiter, based on the first possibility of acceptance and the information on results of job recruiting searches of the job recruiters, wherein the outputting includes outputting the second possibility of acceptance.

17. A job recruiting support method performed on a computer, by which a job recruiter searches information on a desired job seeker from information on job seekers, the method comprising:

inputting job recruiting conditions of the job recruiter using a user interface of the computer;

automatically extracting, by the computer, job recruiting searches of persons other than the job recruiter from a memory, if the job recruiting searches are based on job recruiting conditions similar to the input job recruiting conditions of the job recruiter;

extracting job seeker responses to the extracted job recruiting searches from the memory;

extracting information on job seekers from the memory, based on the input job recruiting conditions; and outputting at least one of the extracted job seeker responses and the extracted information on the job seekers on a display of the computer, to enable the job recruiter to select the desired job seeker.

18. The job recruiting support method according to claim 17, wherein any job seeker response includes information on a result of a respective job recruiting search.

19. The job recruiting support method according to claim 17, further comprising:

calculating a possibility that a job seeker may accept a job to be offered by the job recruiter, based on the extracted information on the job seeker, wherein the outputting includes outputting the calculated possibility of acceptance.

20. The job seeking support method according to claim 17, further comprising:

a first acceptance-possibility calculation calculating a first possibility that a job seeker may accept a job to be offered by the job recruiter, based on the extracted information on the job seeker; and a second acceptance-possibility calculation calculating a second possibility that the job seeker may accept the job to be offered by the job recruiter, based on the first possibility of acceptance and the information on results of job recruiting searches of the job recruiters, wherein the outputting includes outputting the second possibility of acceptance.

21. A computer-readable recording medium storing a program that allows a job seeker to search information on a desired job recruiter from information on job recruiters, the program causing a computer to execute a method comprising:

inputting job seeking conditions of the job seeker;

extracting job applications of persons other than the job seeker, if the job applications are based on job seeking conditions similar to the job seeking conditions of the job seeker;

extracting job recruiter responses of job recruiters related to the extracted job applications; and outputting the extracted job recruiter responses including information on the job recruiters, to enable the job seeker to select the desired job recruiter.

22. A computer-readable recording medium storing a program that allows a job seeker to search information on a desired job recruiter from information on job recruiters, the program causing a computer to execute a method comprising:

inputting job seeking conditions of the job seeker;

extracting information on job recruiters, based on the input job seeking conditions;

extracting job applications of persons other than the job seeker, if the job applications are based on job seeking conditions similar to the input job seeking conditions of the job seeker;

extracting job recruiter responses of the job recruiters to the job applications; and outputting at least one of the extracted information on the job recruiters and the extracted job recruiter responses, to enable the job seeker to select the desired job recruiter.

23. A computer-readable recording medium storing a program that allows a job seeker to search information on a desired job recruiter from information on job recruiters, the program causing a computer to execute a method comprising:
- inputting job seeking conditions of the job seeker;
- extracting job applications of persons other than the job seeker if the job applications are based on job seeking conditions similar to the input job seeking conditions of the job seeker;
- extracting job recruiter responses related to the job applications;
- extracting information on job recruiters, based on the input job seeking conditions; and
- outputting at least one of the extracted job recruiter responses and the extracted information on the job, to enable the job seeker to select the desired job recruiter.

24. A computer-readable recording medium storing a job recruiting support program that allows a job recruiter to search information on a desired job seeker from information on a plurality of job seekers, the program causing a computer to execute a method comprising:
- inputting job recruiting conditions of the job recruiter;
- extracting job recruiting searches of persons other than the job recruiter, if the job recruiting searches are based on job recruiting conditions similar to the input job recruiting conditions of the job recruiter;
- extracting job seeker responses related to the extracted job recruiting searches; and
- outputting the extracted job seeker responses to enable the job recruiter to select the desired job seeker.

25. A computer-readable recording medium storing a job recruiting support program that allows a job recruiter to search information on a desired job seeker from information on a plurality of job seekers, the program causing a computer to execute a method comprising:
- inputting job recruiting conditions of the job recruiter;
- extracting information on job seekers, based on the input job recruiting conditions;
- extracting job recruiting searches of persons other than the job recruiter, if the job recruiting searches are based on job recruiting conditions similar to the input job recruiting conditions of the job recruiter;
- extracting job seeker responses to the job recruiting searches; and
- outputting at least one of the extracted information on the job seekers and the extracted job seeker responses to enable the job recruiter to select the desired job seeker.

26. A computer-readable recording medium storing a job recruiting support program that allows a job recruiter to search information on a desired job seeker from information on a plurality of job seekers, the program causing a computer to execute a method comprising:
- inputting job recruiting conditions of the job recruiter;
- extracting job recruiting searches of persons other than the job recruiter, if the job recruiting searches are based on job recruiting conditions similar to the input job recruiting conditions of the job recruiter;
- extracting job seeker responses to the extracted job recruiting searches;
- extracting information on job seekers, based on the input job recruiting conditions; and
- outputting at least one of the extracted job seeker responses and the extracted information on the job seekers to enable the job recruiter to select the desired job seeker.

27. A job seeking support apparatus to assist a job seeker search for a desired job recruiter using information on job recruiters, the apparatus comprising
- a job seeking information input unit used to input job seeking conditions of the job seeker;
- a job seeking information extraction unit which extracts job applications of persons other than the job seeker, if the job applications are based on job seeking conditions similar to the input job seeking conditions;
- a job recruiter response information extraction unit which extracts job recruiter responses related to the job applications extracted by the job seeking information extraction unit; and
- an output unit which outputs the extracted job recruiter responses to enable the job seeker to select the desired job recruiter.

28. A job seeking support apparatus to assist a job seeker search for a desired job recruiter using information on job recruiters, the apparatus comprising:
- a job seeking information input unit used to input job seeking conditions of the job seeker;
- a job recruiter information extraction unit which extracts information on job recruiters, based on the input job seeking conditions;
- a job seeking information extraction unit which extracts job applications of persons other than the job seeker, if the job recruiting applications are based on job seeking conditions similar to the input job seeking conditions of the job seeker;
- a job recruiter response information extraction unit which extracts job recruiter responses related to the job applications extracted by the job seeking information extraction unit; and
- an output unit which outputs at least one of the extracted information on job recruiters and the extracted job recruiter responses to enable the job seeker to select the desired job recruiter.

29. A job seeking support apparatus to assist a job seeker search for a desired job recruiter using information on job recruiters, the apparatus comprising:
- a job seeking information input unit used to input job seeking conditions of the job seeker;
- a job seeking information extraction unit which extracts job applications of persons other than the job seeker, if the job applications are based on job seeking conditions similar to the input job seeking conditions of the job seeker;
- a job recruiter response information extraction unit which extracts job recruiter responses related to the extracted job applications;
- a job recruiter information extraction unit which extracts information on job recruiters, based on the input job seeking conditions of the job seeker; and
- an output unit which outputs at least one of the extracted job recruiter responses and the extracted information on the job recruiters to enable the job seeker to select the desired job recruiter.

30. A job recruiting support apparatus to assist a job recruiter search for a desired job seeker from information on job seekers, the apparatus comprising:
- a job recruiting information input unit used to input job recruiting conditions of the job recruiter;
- a job recruiting information extraction unit which extracts job recruiting searches of persons other than the job recruiter, if the job recruiting searches are based on job recruiting conditions similar to those of the input job recruiting conditions of the job recruiter;
- a job seeker response information extraction unit which extracts job seeker responses of the job seekers related to the extracted job recruiting searches; and an output unit which outputs the extracted job seeker responses to enable the job recruiter to select the desired job seeker.

31. A job recruiting support apparatus to assist a job recruiter search for a desired job seeker from information on job seekers, the apparatus comprising:

a job recruiting information input unit used to input job recruiting conditions of the job recruiter;

a job seeker information extraction unit which extracts information on job seekers, based on the input job recruiting conditions of the job recruiter;

a job recruiting information extraction unit which extracts job recruiting searches of persons other than the job recruiter, if the job recruiting searches are based on job searching conditions similar to the input job recruiting conditions of the job recruiter;

a job seeker response information extraction unit which extracts job seeker responses of the job seekers the job recruiting searches extracted by the job recruiting information extraction unit; and an output unit which outputs at least one of the extracted information on the job seeker and the extracted job seeker responses to enable the job recruiter to select the desired job seeker.

32. A job recruiting support apparatus to assist a job recruiter search for a desired job seeker using information on job seekers, the apparatus comprising:

a job recruiting information input unit used to input job recruiting conditions of the job recruiter;

a job recruiting information extraction unit which extracts job recruiting searches of persons other than the job recruiter, if the job recruiting searches are based on job recruiting conditions similar to the input job recruiting conditions of the job recruiter;

a job seeker response information extraction unit which extracts responses of job seekers to the job recruiting searches extracted by the job recruiting information extraction unit;

a job seeker information extraction unit which extracts information job seekers, based on the input job recruiting conditions; and an output unit which outputs at least one of the extracted job seeker responses and the extracted information on the job seekers to enable the job recruiter to select the desired job seeker.

* * * * *

UNITED STATES PATENT AND TRADEMARK OFFICE
CERTIFICATE OF CORRECTION

PATENT NO. : 7,702,515 B2  Page 1 of 1
APPLICATION NO. : 10/279882
DATED : April 20, 2010
INVENTOR(S) : Akio Fujino et al.

It is certified that error appears in the above-identified patent and that said Letters Patent is hereby corrected as shown below:

Column 21, Line 43, change "claim 1" to --claim 1,--

Signed and Sealed this

Thirteenth Day of July, 2010

David J. Kappos
*Director of the United States Patent and Trademark Office*